United States Patent
Kwak et al.

(10) Patent No.: US 12,411,521 B2
(45) Date of Patent: Sep. 9, 2025

(54) INPUT SENSING SLIDABLE STRUCTURE OF FLEXIBLE DISPLAY MODULE AND ELECTRONIC DEVICE INCLUDING THE SAME

(71) Applicant: SAMSUNG ELECTRONICS CO., LTD., Suwon-si (KR)

(72) Inventors: Myunghoon Kwak, Suwon-si (KR); Minuk Kim, Suwon-si (KR); Byounguk Yoon, Suwon-si (KR); Hyunju Hong, Suwon-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 220 days.

(21) Appl. No.: 18/080,354

(22) Filed: Dec. 13, 2022

(65) Prior Publication Data
US 2023/0122323 A1    Apr. 20, 2023

Related U.S. Application Data

(63) Continuation of application No. PCT/KR2021/007489, filed on Jun. 15, 2021.

(30) Foreign Application Priority Data
Jun. 16, 2020 (KR) .................. 10-2020-0073042

(51) Int. Cl.
*G06F 1/16* (2006.01)
*G06F 3/041* (2006.01)
*G06F 3/044* (2006.01)

(52) U.S. Cl.
CPC .......... *G06F 1/1624* (2013.01); *G06F 1/1652* (2013.01); *G06F 3/0412* (2013.01); *G06F 3/0448* (2019.05); *G06F 2203/04112* (2013.01)

(58) Field of Classification Search
CPC .... G06F 1/1625; G06F 1/1652; G06F 1/1656; G06F 1/1645; G06F 3/041; G06F 3/0412;
(Continued)

(56) References Cited

U.S. PATENT DOCUMENTS

| 4,931,782 A | 6/1990 | Jackson |
| 8,711,566 B2 | 4/2014 | O'Brien |

(Continued)

FOREIGN PATENT DOCUMENTS

| JP | 2015069280 A | 4/2015 |
| KR | 1020150134569 A | 12/2015 |

(Continued)

OTHER PUBLICATIONS

Korean Office Action for Korean patent application Appl. No. 10-2020-0073042 dated Aug. 16, 2024.
(Continued)

*Primary Examiner* — Liliana Cerullo
(74) *Attorney, Agent, or Firm* — CANTOR COLBURN LLP

(57) ABSTRACT

An electronic device includes a display module including a first region and a second region which extends from the first region and tactically senses an input via a conductive layer, a first structure facing the display module, a second structure slidably connected to the first structure, and slidable together with the display module along the first structure, and a back cover forming a rear surface of the electronic device and including a window region, and the conductive layer which is on the window region. The second structure which slides towards and away the first structure respectively closes and opens the electronic device, the electronic device which is closed defines the front surface including the first region, together with the second region tactically exposed at the window region, and the electronic device which is open (Continued)

defines the front surface including the first region and a portion of the second region.

20 Claims, 18 Drawing Sheets

(58) Field of Classification Search
CPC .... G06F 3/0448; G06F 3/0445; G06F 3/0446; G06F 2203/04102
See application file for complete search history.

(56) References Cited

U.S. PATENT DOCUMENTS

| | | | |
|---|---|---|---|
| 9,170,659 | B2 | 10/2015 | Kim et al. |
| 9,195,272 | B2 | 11/2015 | O'Brien |
| 9,244,534 | B2 | 1/2016 | Tho |
| 9,323,398 | B2 | 4/2016 | Bernstein et al. |
| 9,836,148 | B2 | 12/2017 | Kim et al. |
| 10,488,957 | B2 | 11/2019 | Kim et al. |
| 10,528,203 | B2 | 1/2020 | Hara et al. |
| 10,627,947 | B2 | 4/2020 | Kono |
| 10,725,595 | B2 | 7/2020 | Schooley et al. |
| 11,003,207 | B2 | 5/2021 | Kim et al. |
| 11,112,915 | B2 | 9/2021 | Schooley et al. |
| 11,252,826 | B2 | 2/2022 | Park et al. |
| 2010/0108409 | A1* | 5/2010 | Tanaka .................. G06F 3/0412 345/174 |
| 2011/0007021 | A1 | 1/2011 | Bernstein et al. |
| 2011/0050583 | A1 | 3/2011 | Tho |
| 2013/0058063 | A1 | 3/2013 | O'Brien |
| 2014/0211399 | A1 | 7/2014 | O'Brien |
| 2014/0347330 | A1 | 11/2014 | Kim et al. |
| 2015/0339093 | A1 | 11/2015 | Cho et al. |
| 2016/0202781 | A1 | 7/2016 | Kim et al. |
| 2016/0239143 | A1 | 8/2016 | Song |
| 2017/0003796 | A1 | 1/2017 | Kono |
| 2018/0088695 | A1 | 3/2018 | Kim et al. |
| 2018/0107304 | A1 | 4/2018 | Hara et al. |
| 2019/0261519 | A1 | 8/2019 | Park et al. |
| 2019/0317550 | A1 | 10/2019 | Kim et al. |
| 2019/0324574 | A1 | 10/2019 | Schooley et al. |
| 2020/0319734 | A1 | 10/2020 | Schooley et al. |
| 2021/0263552 | A1 | 8/2021 | Kim et al. |
| 2022/0091688 | A1 | 3/2022 | Kim et al. |
| 2022/0279666 | A1 | 9/2022 | Park et al. |

FOREIGN PATENT DOCUMENTS

| | | |
|---|---|---|
| KR | 1020160087460 A | 7/2016 |
| KR | 20160101763 A | 8/2016 |
| KR | 1020160120913 A | 10/2016 |
| KR | 1020170011954 A | 2/2017 |
| KR | 1020170141804 A | 12/2017 |
| KR | 20180010952 A | 1/2018 |
| KR | 20180030435 A | 3/2018 |
| KR | 10-1993390 B1 | 6/2019 |
| KR | 20190101184 A | 8/2019 |
| KR | 1020190119719 A | 10/2019 |

OTHER PUBLICATIONS

Korean Office Action for Korean Patent Application No. 10-2020-0073042 dated Apr. 16, 2025.

* cited by examiner

INPUT SENSING SLIDABLE STRUCTURE OF FLEXIBLE DISPLAY MODULE AND ELECTRONIC DEVICE INCLUDING THE SAME

CROSS-REFERENCE TO RELATED APPLICATIONS

This application is a Bypass Continuation Application of International Application No. PCT/KR2021/007489 designating the United States, filed on Jun. 15, 2021 in the Korean Intellectual Property Receiving Office, and claiming priority to Korean Patent Application No. 10-2020-0073042, filed on Jun. 16, 2020, the disclosures of which are incorporated by reference herein in their entireties.

BACKGROUND

Field

Various embodiments of the disclosure described herein relate to an electronic device including a flexible display module.

Description of the Related Art

An electronic device may include a flexible display module. The electronic device may expand a display region visually exposed on an outer surface of the electronic device. For example, the flexible display module may be disposed in a curved, foldable, or rollable form in the electronic device.

DISCLOSURE

Technical Problem

Recently, various forms of electronic devices have been developed to secure an expanded display region without affecting portability. For example, the electronic devices may include a slide type electronic device in which a first structure (e.g., a first housing) and a second structure (e.g., a second housing) slide relative to each other, or a foldable electronic device in which a first housing and a second housing are disposed to be folded or unfolded.

In the slide type electronic device among the various forms of electronic devices, a display region exposed in a front direction of the electronic device may be expanded as a flexible display is withdrawn by sliding of the first structure (e.g., the first housing) and the second structure (e.g., the second housing). In this case, at least a portion of the flexible display may be disposed to face a rear direction of the electronic device as the flexible display is rolled in a closed state in which the first structure and the second structure overlap each other.

Various embodiments of the disclosure provide an electronic device capable of visually exposing at least a portion of a flexible display in a rear direction of the electronic device in a closed state of the electronic device. In addition, various embodiments of the disclosure provide an electronic device capable of high-sensitivity touch input on a rear surface of an electronic device in a closed state of the electronic device.

SUMMARY

An electronic device according to an embodiment of the disclosure includes a first structure, a second structure that is connected to the first structure so as to slide relative to the first structure and that surrounds at least a portion of the first structure, a display module that is disposed on the second structure and that is movable together with the second structure relative to the first structure, and a back cover that forms at least a portion of an outer surface of the electronic device and that is disposed to face the first structure. The display module includes a first region and a second region that extends from the first region, and the first region or the second region is formed to be at least partially flexible. The back cover includes a window region having at least a partial region formed of a transparent or translucent material and a conductive layer disposed on at least a portion of the window region to face toward the first structure. The electronic device includes a first state in which the first region forms a front surface of the electronic device and at least a portion of the second region is disposed between the first structure and the back cover and visually exposed on a rear surface of the electronic device through the window region and a second state in which at least a portion of the second region forms the front surface of the electronic device together with the first region. In the first state, at least a portion of the second region is configured to receive a touch input from the outside through the window region and the conductive layer.

An electronic device according to an embodiment of the disclosure includes a case including a support member, a first side member, and a second side member, the first side member and the second side member being disposed on opposite end portions of the support member, a first structure having at least a portion surrounded by the case, a second structure connected with the first structure so as to slide relative to the first structure, a display module disposed on the second structure so as to be movable together with the second structure relative to the first structure and formed to be at least partially flexible, the display module including a first region and a second region that extends from the first region, and a back cover that forms at least a portion of a rear surface of the electronic device and that is disposed to surround the support member, the back cover including a window region formed to be transparent and a conductive layer disposed on at least a portion of the window region. The electronic device is changed between a first state and a second state as the second structure slides. In the first state, the first region forms a front surface of the electronic device, and at least a portion of the second region is visually exposed on the rear surface of the electronic device through the window region. In the second state, at least a portion of the second region forms the front surface of the electronic device together with the first region. In the first state, at least a portion of the second region is located to face the window region and the conductive layer and configured to receive a touch input from the outside through the window region and the conductive layer.

Advantageous Effects

The electronic device according to the various embodiments of the disclosure may have an exposed region in the back cover such that at least a portion of the flexible display module is visually exposed through the back cover. Accordingly, the front surface and the rear surface of the electronic device may be used as a display region.

Furthermore, the electronic device according to the various embodiments of the disclosure may have a conductive material disposed or formed on at least a portion of the back cover, thereby improving the sensitivity of a touch input through the back cover.

In addition, the disclosure may provide various effects that are directly or indirectly recognized.

DESCRIPTION OF DRAWINGS

The above and other advantages and features of this disclosure will become more apparent by describing in further detail embodiments thereof with reference to the accompanying drawings, in which.

With regard to description of the drawings, identical or similar reference numerals may be used to refer to identical or similar components.

DETAILED DESCRIPTION

Hereinafter, various embodiments of the disclosure may be described with reference to accompanying drawings. Accordingly, those of ordinary skill in the art will recognize that modification, equivalent, and/or alternative on the various embodiments described herein can be variously made without departing from the scope and spirit of the disclosure.

Figure 1A:
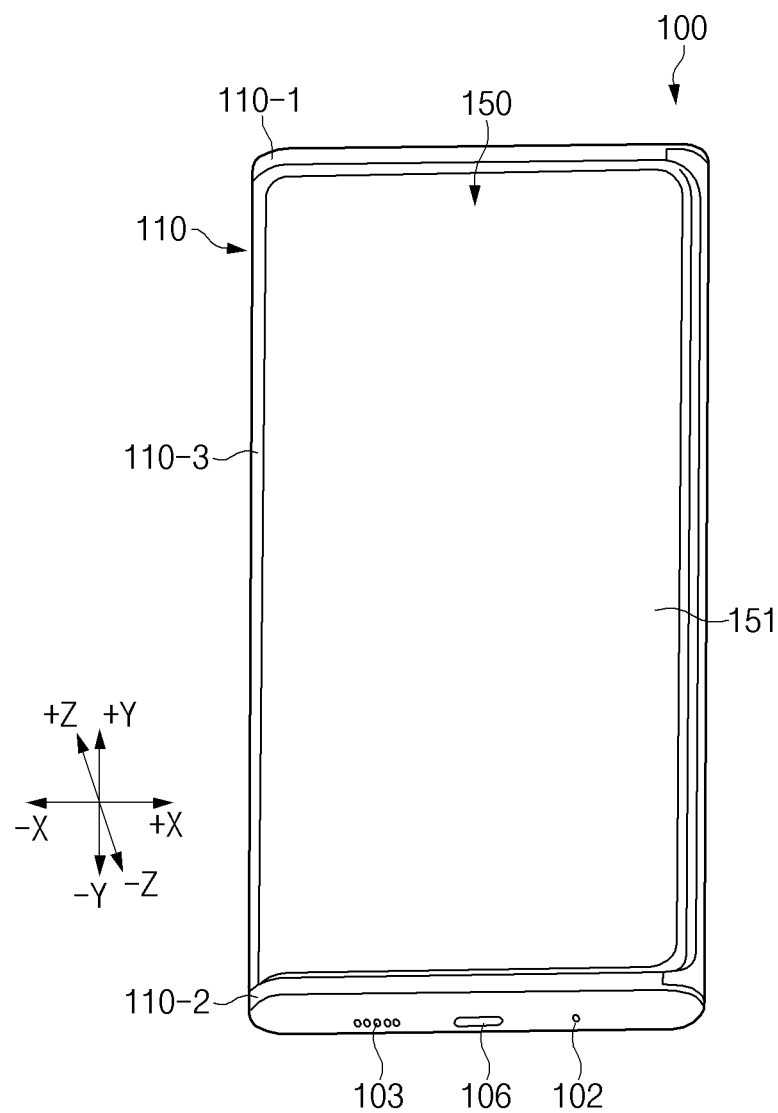
FIGS. 1A and 1B are views illustrating a first state of an electronic device according to an embodiment.
Figure 1B:
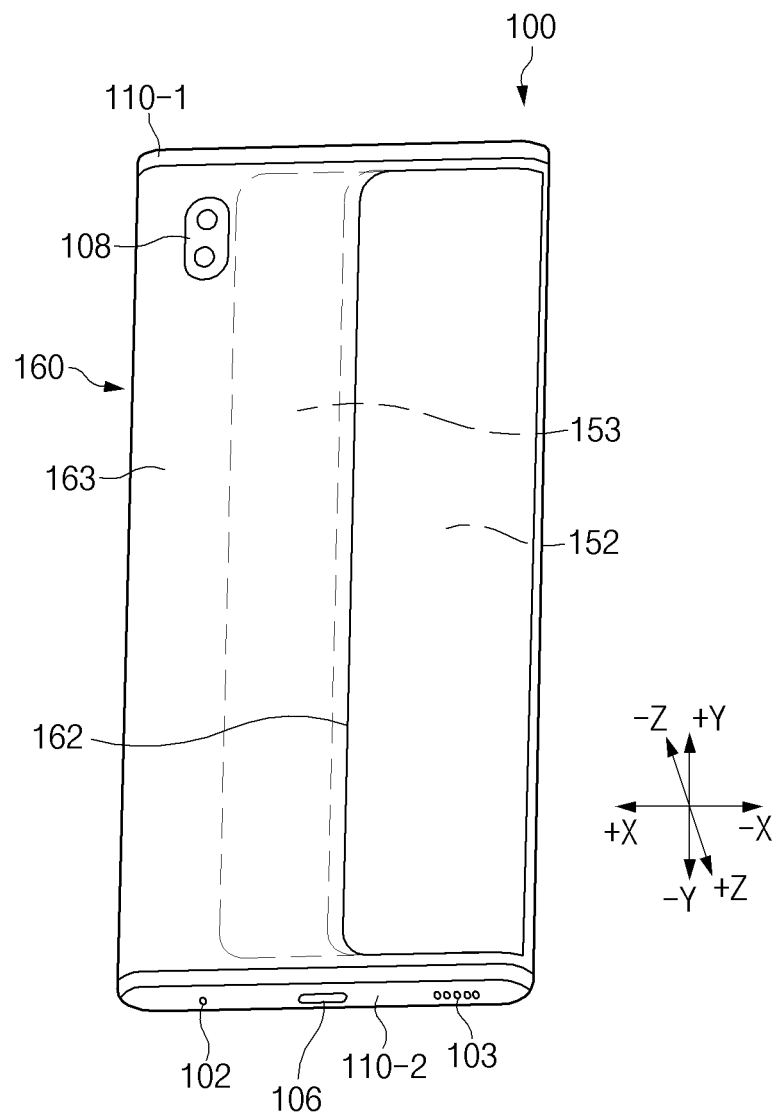
Figure 2A:
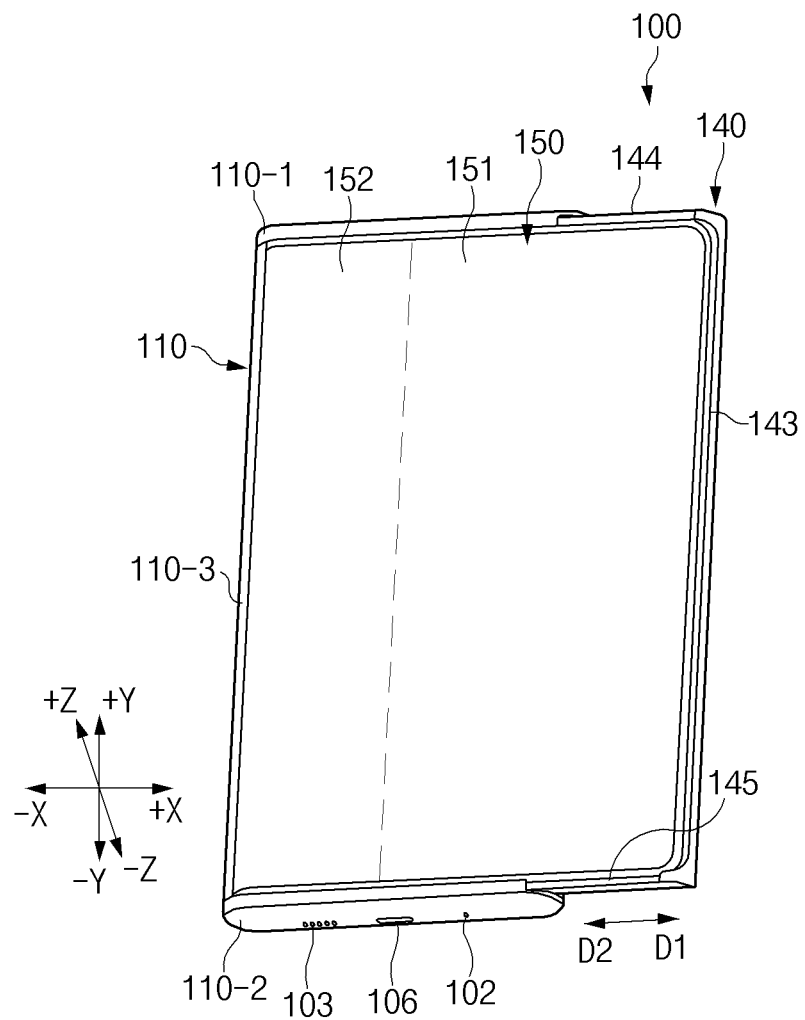
FIGS. 2A and 2B are views illustrating a second state of the electronic device according to an embodiment.
Figure 2B:
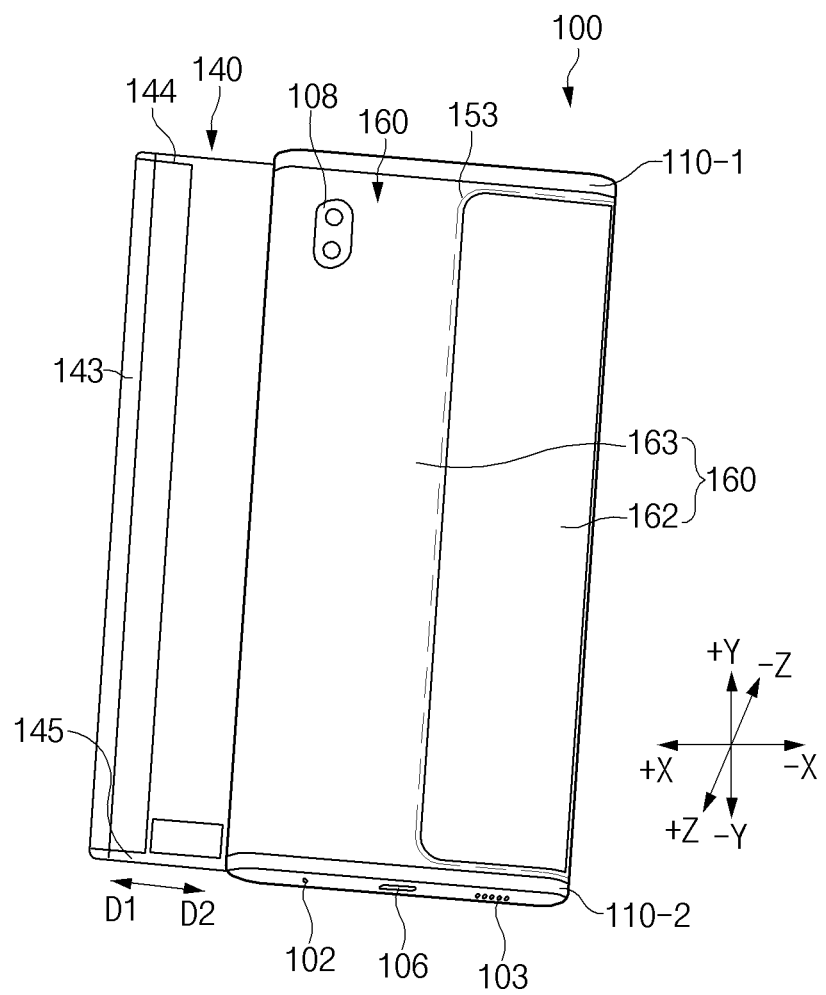

FIGS. 1A and 1B (otherwise referred to as FIG. 1) are views illustrating a first state of an electronic device according to an embodiment. FIGS. 2A and 2B (otherwise referred to as FIG. 2) are views illustrating a second state of the electronic device according to an embodiment.

FIGS. 1A and 1B are views respectively illustrating a front surface and a rear surface of the electronic device when the electronic device is in the first state. FIGS. 2A and 2B are views respectively illustrating the front surface and the rear surface of the electronic device when the electronic device is in the second state.

Referring to FIGS. 1 and 2, the electronic device 100 according to an embodiment may include a case 110, a second structure 140, a display module 150, and a back cover 160. According to an embodiment, the electronic device 100 may include the first state (e.g., the state of FIG. 1) and the second state (e.g., the state of FIG. 2). For example, the first state and the second state of the electronic device 100 may be determined depending on the position of the second structure 140 relative to the case 110, and the electronic device 100 may be configured to be changed (e.g. changeable) between the first state and the second state by a manual operation such as a user operation or an automatic or electrical operation such as a mechanical operation.

In an embodiment of the disclosure, the first state of the electronic device 100 may refer to a closed state in which the electronic device 100 is closed (e.g., the electronic device 100 which is closed) such that at least a portion (e.g., a first peripheral portion 143) of the second structure 140 is brought into contact with the case 110. That is, the electronic device 100 which is closed disposes the first peripheral portion 143 in contact with the case 110. The second state of the electronic device 100 may refer to an opened state in which the electronic device 100 is opened such that at least a portion (e.g., the first peripheral portion 143) of the second structure 140 is spaced apart from the case 110. That is the electronic device 100 which is open disposes the first peripheral portion 143 spaced apart from (e.g., non-contacting) the case 110. As illustrated, a state (the state of FIG. 1) in which a portion (e.g., a second peripheral portion 144 or a third peripheral portion 145) of the second structure 140 is inserted into (e.g., inside) side members 110-1 and 110-2 of the case 110 may be defined as the first state, and a state (the state of FIG. 2) in which a portion (e.g., the second peripheral portion 144 or the third peripheral portion 145) of the second structure 140 is withdrawn from (e.g., extended outside) the side members 110-1 and 110-2 of the case 110 may be defined as the second state.

In an embodiment of the disclosure, a surface facing a direction substantially the same as a direction that at least a portion (e.g., a first region 151) of the display module 150 located outside the electronic device 100 faces may be defined as the front surface of the electronic device 100, and a surface facing away from the front surface may be defined as the rear surface of the electronic device 100. A surface surrounding a space between the front surface and the rear surface may be defined as a side surface of the electronic device 100. For example, the front surface of the electronic device 100 may refer to surfaces that form the exterior of the electronic device 100 when a portion (e.g., the first region 151) of the display module 150 located outside the electronic device 100 is viewed, and the rear surface of the electronic device 100 may refer to surfaces that form the exterior of the electronic device 100 when the back cover 160 is viewed. An outer surface of the electronic device 100 that substantially faces the +Z-axis direction may be construed as the front surface of the electronic device 100, and an outer surface of the electronic device 100 that substantially faces the −Z-axis direction may be construed as the rear surface of the electronic device 100.

In an embodiment, the case 110 may form at least a portion of the side surface of the electronic device 100, and the electronic device 100 may be changed between the first state and the second state as the second structure 140 and the display module 150 slide relative to the case 110 in opposite directions (e.g., a first direction D1 and a second direction D2). The second structure 140 and the display module 150 may be slidable relative to the case 110. A sliding direction of the second structure 140 and the display module 150 may be defined along the first direction D1 and the second direction D2. The second structure 140 and the display module 150 may be slidable together with each other, relative to the case 110.

In an embodiment, the case 110 may include the first side member 110-1, the second side member 110-2, and a support member 110-3 as a third side member. The first side member 110-1 and the second side member 110-2 may be disposed to face each other in a direction substantially perpendicular to a sliding direction of the second structure 140 (e.g., the first direction D1 and the second direction D2). The support member 110-3 may be disposed between the first side member 110-1 and the second side member 110-2 and may be connected to the first side member 110-1 and the second side member 110-2. The support member 110-3 may connect the first side member 110-1 and the second side member 110-2. For example, one end portion (e.g., an end portion in the +Y-axis direction as a first end) of the support member 110-3 may be connected with one end portion of the first side member 110-1, and an opposite end portion (e.g., an end portion in the −Y-axis direction as a second end) of the support member 110-3 may be connected with one end portion of the second side member 110-2.

In an embodiment, the first side member 110-1, the second side member 110-2, and/or the support member 110-3 of the case 110 may be integrally formed. In another embodiment, the first side member 110-1, the second side member 110-2, and/or the support member 110-3 may be formed as separate components and may be assembled or fastened together. The first side member 110-1, the second side member 110-2 and the support member 110-3 may together define an opening of the case 110 at which the second support 140 is slidable into and out of the case 110. That is, the case 110 may be open in the sliding direction.

In an embodiment, when the front surface (e.g., a surface facing the +Z-axis direction) of the electronic device 100 is viewed (e.g., a view along a third direction, that is, the Z direction), the support member 110-3 may be disposed such that at least a portion of the support member 110-3 overlaps the second structure 140 and/or the display module 150 in the +Z/−Z-axis direction, and only another portion of the support member 110-3 may be exposed in a lateral direction (e.g., the +X/−X-axis direction) of the electronic device 100. Furthermore, when the rear surface (e.g., a surface facing the −Z-axis direction) of the electronic device 100 is viewed (e.g., a view along the third direction), the support member 110-3 may overlap the back cover 160 in the +Z/−Z-axis direction and may be hidden by the back cover 160, and thus the support member 110-3 may not be visually exposed to outside the electronic device 100 at the rear thereof.

In an embodiment, the first side member 110-1 and the second side member 110-2 may be disposed on the opposite end portions of the support member 110-3. For example, the one end portion (e.g., an end portion in the −X-axis direction) of the first side member 110-1 may be connected to the one end portion (e.g., an end portion in the +Y-axis direction) of the support member 110-3, and the one end portion (e.g., an end portion in the −X-axis direction) of the second side member 110-2 may be connected to the opposite end portion (e.g., an end portion in the +Y-axis direction) of the support member 110-3. As the second structure 140 and/or the display module 150 slides between the first side member 110-1 and the second side member 110-2, the second structure 140 and/or at least one portion of the display module 150 may be inserted into the case 110 or may be withdrawn from the case 110, at through the opening of the case 110. For example, when the electronic device 100 is changed from the first (closed) state to the second (open) state, the second structure 140 and the at least one portion (e.g., the first region 151) of the display module 150 may move in the first direction D1 (e.g., an open direction) between the first side member 110-1 and the second side member 110-2, and another portion (e.g., a third region 153) of the display module 150 may move in the second direction D2. In contrast, when the electronic device 100 is changed from the second (open) state to the first (closed) state, the second structure 140 and the at least one portion (e.g., the first region 151) of the display module 150 may move in the second direction D2 between the first side member 110-1 and the second side member 110-2, and the other portion (e.g., the third region 153) of the display module 150 may move in the first direction D1.

In an embodiment, the second structure 140 may be configured to slide relative to the case 110. For example, at least a portion of the second structure 140 may move relative to the case 110 in the first direction D1 or the second direction D2 in a state of being substantially parallel to the case 110.

In an embodiment, the second structure 140 may include the plurality of peripheral portions 143, 144, and/or 145 that surround at least a portion of the periphery of the display module 150. The peripheral portions 143, 144, and/or 145 may surround the periphery of the display module 150 at a distal end of the display module 150. The plurality of peripheral portions 143, 144, and/or 145 may include the first peripheral portion 143 extending in a direction perpendicular to the sliding direction of the second structure 140 (e.g., the first direction D1 or the second direction D2), the second peripheral portion 144 that is connected with one end portion (e.g., an end portion in the +Y-axis direction) of the first peripheral portion 143 and that extends in a direction parallel to the sliding direction of the second structure 140 (e.g., the first direction D1 and the second direction D2), and the third peripheral portion 145 that is connected with an opposite end portion (e.g., an end portion in the −Y-axis direction) of the first peripheral portion 143 and that extends in a direction parallel to the sliding direction of the second structure 140 (e.g., the first direction D1 and the second direction D2).

In an embodiment, when the electronic device 100 is in the first state, the first peripheral portion 143 may extend between distal ends of the first side member 110-1 and the second side member 110-2 and may be exposed on the exterior of the electronic device 100 (e.g., exposed to outside the electronic device 100). At least part of the first peripheral portion 143 may be brought into contact with the distal ends of the first side member 110-1 and the second side member 110-2 in the first state. When the electronic device 100 is changed from the first state to the second state, the first peripheral portion 143 may move in the first direction D1 and may be spaced apart from the first side member 110-1 and the second side member 110-2.

In an embodiment, the second peripheral portion 144 and the third peripheral portion 145 may be inserted into (e.g., insertable into) or withdrawn from (e.g., withdrawable from) the first side member 110-1 and the second side member 110-2, respectively. For example, when the first peripheral portion 143 moves in the first direction D1, the second peripheral portion 144 may be withdrawn from the first side member 110-1, and the third peripheral portion 145 may be withdrawn from the second side member 110-2. The second and third peripheral portions 144 and 145 may slide together with each other along the sliding direction. In contrast, when the first peripheral portion 143 moves in the second direction D2, at least part of the second peripheral portion 144 may be inserted into the first side member 110-1, and at least part of the third peripheral portion 145 may be inserted into the second side member 110-2.

In an embodiment, the display module 150 may include the first region 151, a second region 152, and the third region 153. In an embodiment, the second region 152 may extend from the first region 151, and the third region 153 may extend from the second region 152. For example, the second region 152 may be located between the first region 151 and the third region 153. The second region 152 of the display module 150 may be bendable about a bending axis. That is, the first region 151, the second region 152 and the third region 153 may be in order along the sliding direction. The first to third regions 151 to 153 may together define a planar area of the display module 150, without being limited thereto.

In an embodiment, the display module 150 may be disposed on the second structure 140. The display module 150 may be disposed on one surface of the second structure 140 such that at least a portion of the periphery of the display module 150 is surrounded by the plurality of peripheral portions 143, 144, and/or 145 of the second structure 140. For example, the display module 150 may be disposed on the second structure 140 such that at least a partial region of the display module 150 faces a front direction of the electronic device 100 (e.g., the +Z-axis direction). The display module 150 may be configured to move together with the second structure 140 when the second structure 140 slides relative to the case 110. For example, the display module 150 may be attached to the second structure 140 by an adhesive material (e.g., a double-sided tape or glue).

According to an embodiment, as the electronic device 100 is changed between the first state and the second state, an exposed region of the display module 150 exposed in the front direction of the electronic device 100 may be expanded or reduced. A planar area of the display module 150 which is disposed at the front of the electronic device 100 is changeable (e.g., variable), depending upon the open or closed state of the electronic device 100. For example, in the first state, the first region 151 may form a front display region visually exposed on the front surface of the electronic device 100. In the first state, only the first region 151 may define the front display region (e.g., display surface). In the second state, at least a portion of the second region 152, together with the first region 151, may form the front display region visually exposed on the front surface of the electronic device 100. The front display region may be defined as a region in which a predetermined screen is provided on the front surface of the electronic device 100 (e.g., a display surface). A rear display region may be defined as a region in which a predetermined screen is provided on the rear surface of the electronic device 100 (e.g., a display surface).

In an embodiment, the display module 150 may be formed of a flexible material such that, depending on operational states (e.g., the first state and the second state) of the electronic device 100, at least one portion of the display module 150 faces the front direction of the electronic device 100 and another portion of the display module 150 faces a rear direction of the electronic device 100.

In an embodiment, the first region 151 may form a portion of the front surface of the electronic device 100 in both the first state and the second state. In the first state, an entirety of the front surface is the first region 151 (e.g., only the first region 151), while in the second state, the front surface includes an entirety of the first region 151 together with a portion (or an entirety) of the second region 152. In an embodiment, the second region 152 may be visually exposed at the rear surface of the electronic device 100 (e.g., a window region 162) in the first state. The second region 152 may form the front surface of the electronic device 100 together with the first region 151, in the second state. In an embodiment, the third region 153 may not be exposed by being hidden by the back cover 160 in the first state and may be visually exposed to outside the rear surface of the electronic device 100 (e.g., the window region 162), in the second state.

In an embodiment, the back cover 160 may form at least a portion of the rear surface of the electronic device 100. For example, the back cover 160 may be disposed between the first side member 110-1 and the second side member 110-2. In this case, the back cover 160 may be disposed to at least partially overlap the support member 110-3 such that the support member 110-3 is not exposed on the rear surface of the electronic device 100.

In an embodiment, the back cover 160 may include the window region 162 and an opaque region 163. The window regions 162 may be formed of a transparent or translucent material. For example, at least a partial region of the back cover 160 may be formed of (or include) a transparent or translucent material, and thus the window region 162 may be formed (or provided). At least a portion (e.g., the opaque region 163) of the back cover 160 may be formed of a polymer, coated or colored glass, ceramic, metal (e.g., aluminum, stainless steel (STS), or magnesium), or a combination of at least two of the aforementioned materials.

In an embodiment, the second region 152 or the third region 153 of the display module 150 may be visually exposed at the rear surface of the electronic device 100, through the window region 162. For example, in the first state of the electronic device 100, at least a portion of the second region 152 may be visually exposed in the rear direction of the electronic device 100 through the window region 162 (refer to FIG. 1B). In the second state of the electronic device 100, at least a portion of the third region 153 may be visually exposed in the rear direction of the electronic device 100 through the window region 162 (refer to FIG. 2B).

In an embodiment, the electronic device 100 may further include an audio module (e.g., 102 and 103). The audio module (e.g., 102 and 103) may include the microphone hole 102 and the speaker hole 103. A microphone for obtaining external sound may be disposed in the microphone hole 102. The speaker hole 103 may include an external speaker hole 103 and/or a receiver hole (not illustrated) for telephone call. In another embodiment, the speaker hole 103 and the microphone hole 102 may be implemented with a single hole, or a speaker (e.g., a piezoelectric speaker) may be included without the speaker hole 103.

In an embodiment, the electronic device 100 may further include a front camera module (not illustrated) that is visually exposed on the front surface of the electronic device 100 and a rear camera module 108 that is visually exposed on the rear surface of the electronic device 100. Although not illustrated, the front camera module (not illustrated) may be visually exposed through at least a partial region of the display module 150. In another embodiment, the front camera module (e.g., an under display camera (UDC)) may be disposed under the display module 150. For example, the front camera module (not illustrated) may be at least partially disposed under the display module 150 and may be configured to take an image of an object through a portion of an active region of the display module 150. In the other embodiment, the front camera module (not illustrated) may not be visually exposed on a region of the display module 150. The rear camera module 108 may include a plurality of camera modules (e.g., a dual camera or a triple camera). However, the rear camera module 108 is not necessarily limited to including the plurality of camera modules and may be implemented with one camera module in some embodiments. The front camera module (not illustrated) and the rear camera module 108 may include one or more lenses, an image sensor, and/or an image signal processor. Although not illustrated, in another embodiment, the rear camera module 108 and a flash (not illustrated) may be disposed on the rear surface of the electronic device 100. The flash (not illustrated) may include, for example, a light emitting diode or a xenon lamp. In some embodiments, two or more lenses (e.g., a wide angle lens and/or a telephoto lens) and image sensors may be disposed on one surface of the electronic device 100.

In an embodiment, the electronic device 100 may further include a connector hole 106. The connector hole 106 may include a first connector hole 106 capable of accommodating a connector (e.g., a USB connector) for transmitting and receiving power and/or data with an external electronic device and/or a second connector hole (not illustrated) (e.g., an earphone jack) capable of accommodating a connector for transmitting and receiving audio signals with an external electronic device.

Figure 11:
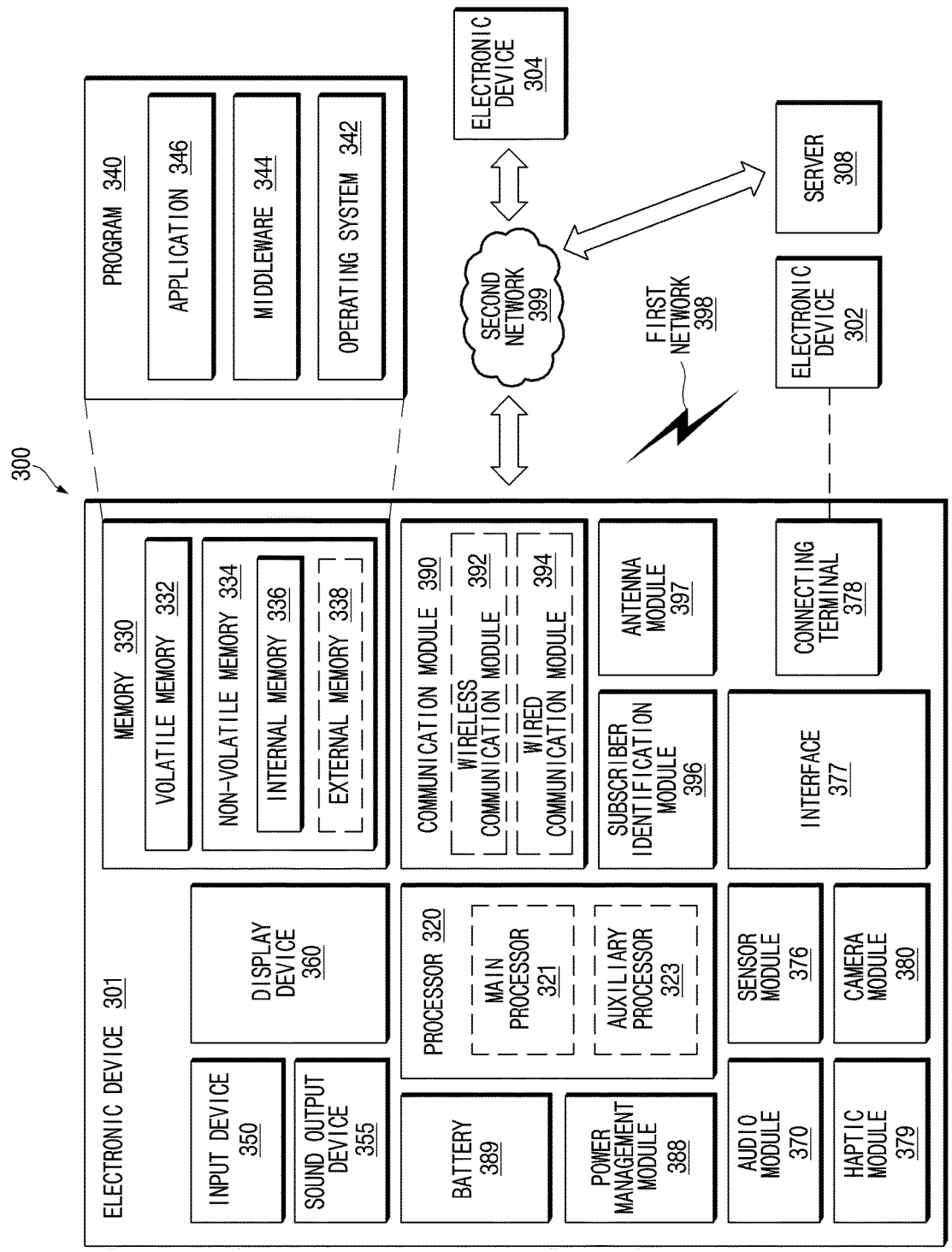
FIG. 11 is a block diagram illustrating an electronic device in a network environment according to an embodiment.

In another embodiment (not illustrated), the electronic device 100 may further include a key input device (not illustrated) (e.g., an input device 350 of an electronic device 301 of FIG. 11). The key input device (not illustrated) may be disposed on the side surface of the electronic device 100. For example, the key input device (not illustrated) may be formed in a button type and may be disposed on the first side member 110-1 and/or the second side member 110-2. Furthermore, for example, the key input device (not illustrated) may be implemented in a form such as a soft key on the display module 150.

In another embodiment (not illustrated), the electronic device 100 may further include a sensor module (not illustrated). The sensor module (not illustrated) (e.g., a sensor module 376 of the electronic device 301 of FIG. 11) may generate an electrical signal or a data value that corresponds to an operational state inside the electronic device 100 or an environmental state external to the electronic device 100. For example, the sensor module may include at least one of a proximity sensor, an HRM sensor, a fingerprint sensor, a time of flight (TOF) sensor, an ultrasonic sensor, a gesture sensor, a gyro sensor, an atmospheric pressure sensor, a magnetic sensor, an acceleration sensor, a grip sensor, a color sensor, an infrared (IR) sensor, a biosensor, a temperature sensor, a humidity sensor, or an illuminance sensor.

As described above, the electronic device 100 according to the embodiment may be changeable between the first state (e.g., the state of FIG. 1) and the second state (e.g., the state of FIG. 2), as the second structure 140 slides (together with the display module 150) relative to the case 110. For example, the first state may refer to a closed state, and the second state may refer to an opened state.

Referring to FIG. 1, the first state may be defined as a state in which the first region 151 of the display module 150 forms an entirety of the front surface of the electronic device 100, and a portion of the second region 152 of the display module 150 is visually exposed to outside the back cover 160 at the rear surface of the electronic device 100 through the window region 162 of the back cover 160. For example, in the first state, the first region 151 may form the front display region (e.g., a region in which a display screen is provided at the front surface of the electronic device 100 as a display region or a display area). In this case, a portion of the second region 152 may form the rear display region (e.g., a region in which a display screen is provided at the rear surface of the electronic device 100 as a display region or a display area). In an embodiment, the rear display region may be configured to receive a touch input from the outside through the window region 162 of the back cover 160 in the first state (e.g., a touch area).

Referring to FIG. 2, the second state may be defined as a state in which at least a portion of the second region 152 of the display module 150 forms the front surface of the electronic device 100 together with the first region 151. For example, as at least a portion of the second region 152, together with the first region 151, forms the front display region in the second state, the front display region may be expanded, compared to that in the first state. That is, the electronic device 100 which is open and which is closed, may respectively include a planar area of the display screen at the front surface of the open electronic device 100, where the planar area of the open electronic device is larger than the planar area of the closed electronic device. In this case, the third region 153 of the display module 150 may be visually exposed at the rear surface of the electronic device 100 in the second state, through the window region 162. The third region 153 may prevent parts disposed in the electronic device 100 from being visually exposed on the rear surface of the electronic device 100 through the window region 162. In an embodiment, the third region 153 may be configured so as not to form the rear display region (e.g., a non-display region or non-display area) or receive a touch input through the window region 162 of the back cover 160 (e.g., a non-touch area). However, the disclosure is not limited thereto, and in another embodiment, the third region 153 may be configured to form the rear display region or receive a touch input through the window region 112 in the second state.

Figure 3:
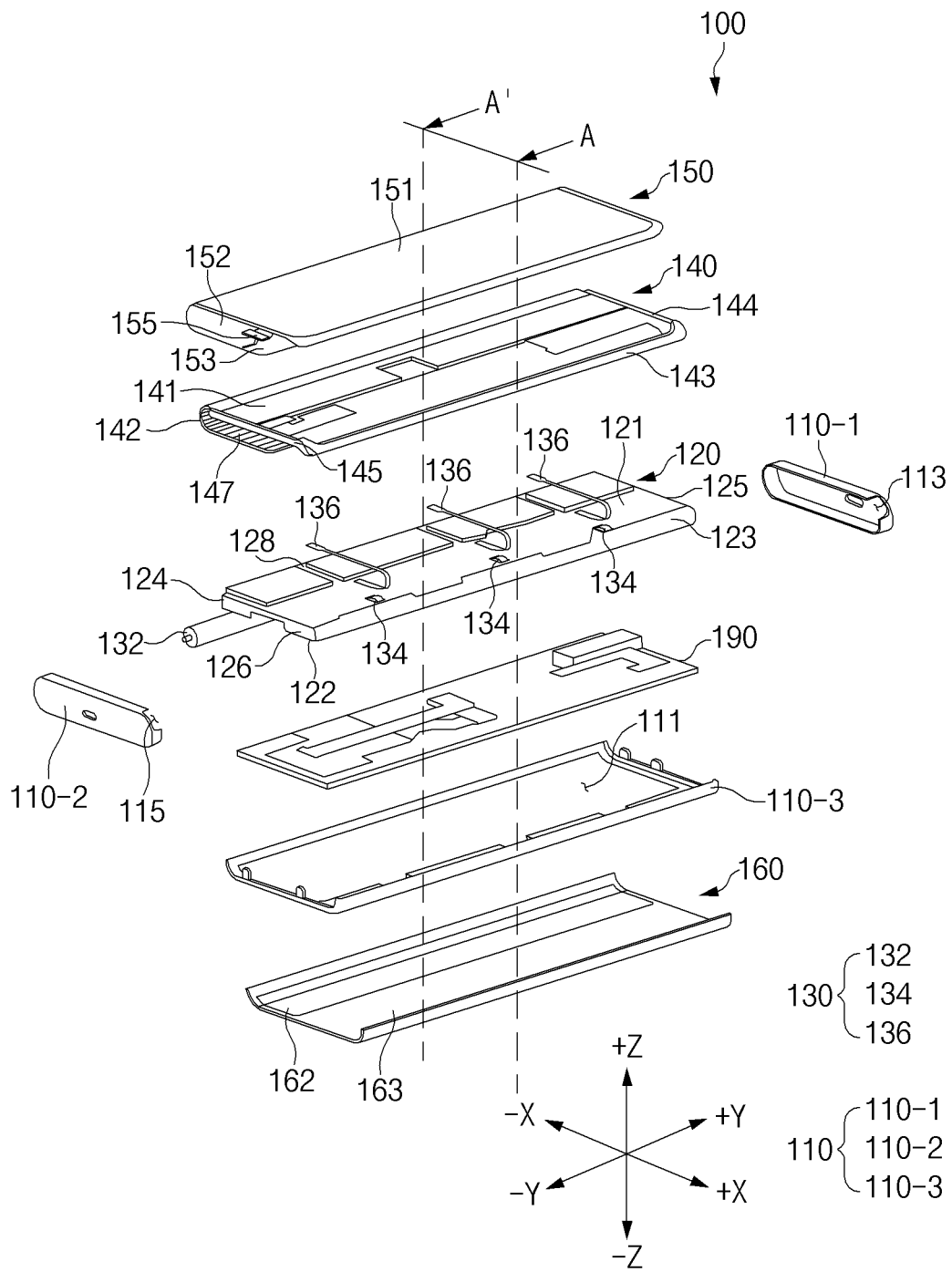
FIG. 3 is an exploded perspective view of the electronic device according to an embodiment.

FIG. 3 is an exploded perspective view of the electronic device according to an embodiment.

Referring to FIG. 3, the electronic device 100 according to an embodiment may include the case 110, a first structure 120, a guide member 130, the second structure 140, the display module 150, the back cover 160, and a circuit board 190.

In an embodiment, the case 110 may include the support member 110-3 disposed on an upper surface (e.g., a surface facing the +Z-axis direction) of the back cover 160, and the first side member 110-1 and the second side member 110-2 disposed on the opposite end portions of the support member 110-3 in a lengthwise direction (e.g., the Y-axis direction) to face each other. The support member 110-3, the first side member 110-1, and the second side member 110-2 may be combined together to form a space in which at least a part of other components (e.g., the circuit board 190, the first structure 120, or the second structure 140) of the electronic device 100 is disposed.

In an embodiment, the support member 110-3 may include an opening region 111 penetrating at least a partial region of the support member 110-3 in an up/down direction (e.g., the Z-axis direction). The support member 110-3 may have a frame shape, owing to the opening region 111. The circuit board 190 and the back cover 160 may be disposed to at least partially face each other through the opening region 111. For example, the support member 110-3 may be disposed between the circuit board 190 and the back cover 160, and a lower surface (e.g., a surface facing the −Z-axis direction) of the circuit board 190 and the upper surface (e.g., a surface facing the +Z-axis direction) of the back cover 160 may face each other through the opening region 111. As the opening region 111 is formed in the support member 110-3, the circuit board 190 and a partial region of the back cover 160 (e.g., a conductive region 165 of FIG. 8) may be electrically connected as will be described below with reference to FIG. 6.

In an embodiment, the first side member 110-1 and the second side member 110-2 may include recesses 113 and 115 formed in partial regions of peripheral portions thereof, respectively, in a direction substantially parallel to the sliding direction of the second structure 140 (e.g., the +X-axis direction or the −X-axis direction). The recesses 113 and 115 may provide spaces that at least parts of the second peripheral portion 144 and the third peripheral portion 145 of the second structure 140 are inserted into or withdrawn from when the second structure 140 slides relative to the first structure 120. For example, when the electronic device 100 is changed to the first state (e.g., the state of FIG. 1) or the second state (e.g., the state of FIG. 2), the second peripheral portion 144 may move through the recess 113 of the first side member 110-1, and the third peripheral portion 145 may move through the recess 115 of the second side member 110-2.

In an embodiment, the first structure 120 may be fixed and/or coupled to the case 110. For example, the first structure 120 and the case 110 may be the basis for sliding of the second structure 140. According to the illustrated embodiment, the first structure 120 and the case 110 may be formed as separate parts and may be assembled and/or coupled with each other. However, the disclosure is not limited thereto, and according to an embodiment to which the disclosure is applied, the first structure 120 and the case 110 may be integrally formed with each other and may be implemented as one part.

In an embodiment, the first structure 120 may include a first surface 121 (e.g., an upper surface or a surface facing the +Z-axis direction), a second surface 122 (e.g., a lower surface or a surface facing the −Z-axis direction) that faces away from the first surface 121, and a plurality of side surfaces 123, 124, 125, and 126 which provide a space together with the first surface 121 and the second surface 122. The plurality of side surfaces 123, 124, 125, and 126 may include the first side surface 123 extending in a direction (e.g., the Y-axis direction) perpendicular to the sliding direction of the second structure 140, the second side surface 124 facing the first side surface 123, and the third side surface 125 and the fourth side surface 126 connecting the first side surface 123 and the second side surface 124 and facing each other. For example, the third side surface 125 may face the first side member 110-1, and the fourth side surface 126 may face the second side member 110-2.

In an embodiment, the first structure 120 may be formed of (or include) a polymer resin (e.g., polypropylene, polyethylene, polystyrene, polyethylene terephthalate, polyamide, polyester, polyvinyl chloride, polyurethane, polycarbonate, or polyvinylidene chloride) or metal.

In an embodiment, at least a portion of the first structure 120 may be surrounded by the second structure 140. For example, the first surface 121, the second side surface 124, and at least a portion of the second surface 122 of the first structure 120 may be covered by the second structure 140. The first structure 120 may be connected with the second structure 140 such that the second structure 140 slides relative to the first structure 120.

In an embodiment, the guide member 130 may connect and/or support the first structure 120 and at least a portion of the second structure 140 such that the second structure 140 is able to slide (e.g., is slidable). The guide member 130 may include a first roller member 132 (e.g., a roller), at least one second roller member 134, and at least one belt member 136 (e.g., a belt).

In an embodiment, the first roller member 132 may be disposed on the second side surface 124 of the first structure 120, and the second roller member 134 may be disposed on the first side surface 123 of the first structure 120. For example, the first roller member 132 may be disposed to face toward the second side surface 124 from outside the first structure 120 and may be coupled so as to be rotatable relative to the first structure 120. The second roller member 134 may be disposed to face toward the first side surface 123 from inside the first structure 120 and may be coupled so as to be rotatable relative to the first structure 120. In another embodiment, the first roller member 132 may include a plurality of rollers.

In an embodiment, the belt member 136 may be disposed inside the first structure 120 to at least partially surround the second roller member 134. For example, at least one portion of the belt member 136 may be accommodated in the first structure 120 (e.g., at a rear side), and another portion of the belt member 136 may be exposed outside the first structure 120 (e.g., at a front side). Opposite end portions of the belt member 136 may be connected to different portions of the second structure 140, respectively. The belt member 136 may be implemented with one strap (or, band), or may be implemented in a form in which two or more straps (or, bands) are fastened with each other. In an embodiment, the belt member 136 may be formed of metal and/or a polymer resin.

A coupling relationship between the first roller member 132, the second roller member 134, the belt member 136, and the second structure 140 will be described below in detail with reference to FIG. 5.

In an embodiment, the first structure 120 may have, on the first surface 121, a depression 128 in which a portion of the belt member 136 exposed outside the first structure 120 is disposed. For example, a partial region of the first surface 121 of the first structure 120 may be recessed toward the second surface 122 to form the depression 128. At least a portion of the belt member 136 may be disposed in the depression 128 and may move together along the depression 128, in the sliding direction of the second structure 140 (e.g., the X-axis direction) when the second structure 140 slides. According to the illustrated embodiment, the belt member 136 may include a plurality of belts, and a plurality of depressions 128 corresponding to the plurality of belts may be formed on the first structure 120. However, the disclosure is not necessarily limited to the illustrated embodiment, and according to an embodiment to which the disclosure is applied, the numbers and/or positions of belt members 136 and depressions 128 may be diversely modified. Furthermore, the belt member 136 and the depression 128 may have different lengths depending on the position in which the belt member 136 is disposed.

In an embodiment, the second structure 140 may be connected with the first structure 120 so as to be slidable relative to the first structure 120. For example, the second structure 140 may slide relative to the first structure 120 and the case 110, and may move in the +X/−X-axis direction relative to the first structure 120 and the case 110 that are relatively fixed in position.

In an embodiment, the second structure 140 may be disposed to surround at least a portion of the first structure 120. For example, the second structure 140 may surround the first surface 121, the second side surface 124, and a partial region of the second surface 122 of the first structure 120. The first surface 121 and the second side surface 124 of the first structure 120 may be covered by the second structure 140 irrespective of operational states (e.g., the first state and the second state) of the electronic device 100, and a region where the second surface 122 of the first structure 120 is covered by the second structure 140 may be expanded or reduced depending on operational states of the electronic device 100.

In an embodiment, the second structure 140 may support the display module 150. For example, the second structure 140 may be closely fixed to the display module 150. The display module 150 which is fixed to the second structure 140, is movable together with the second structure 140. At least a portion of the second structure 140 may be attached to the display module 150 through an adhesive member (e.g., a double-sided tape or glue) disposed between the display module 150 and the second structure 140. The second structure 140, together with the display module 150, may slide relative to the first structure 120.

In an embodiment, the second structure 140 may include a first support portion 141 and a second support portion 142. The second support portion 142 may extend from the first support portion 141. In an embodiment, the first support portion 141 may support at least one portion of the first region 151 of the display module 150, and the second support portion 142 may support another portion of the first region 151, the second region 152, and/or the third region 153 of the display module 150. For example, the first support portion 141 may be disposed to face the one portion of the first region 151. The second support portion 142 may be disposed to face the other portion of the first region 151, the second region 152, and/or the third region 153.

In an embodiment, the first support portion 141 may include the first peripheral portion 143, the second peripheral portion 144, and the third peripheral portion 145. The first peripheral portion 143, the second peripheral portion 144, and the third peripheral portion 145 may surround at least a portion of the first region 151 of the display module 150. The first support portion 141 may be formed of a substantially flat plate. For example, when the second structure 140 slides, the first support portion 141 may move in a state of being substantially parallel to the first structure 120 without being deformed.

In an embodiment, the second support portion 142 may be formed of a bendable material so as to at least partially form a curved surface when the second structure 140 slides. For example, a bending portion of the second support portion 142 may vary depending on operational states (e.g., the first state and the second state) of the electronic device 100. That is, the bending portion may be disposed flat or bent, depending upon the state of the electronic device 100. The second support portion 142 may support the second region 152 such that the second region 152 of the display module 150 slides while forming a curved surface in at least a partial region.

In an embodiment, the second support portion 142 may include a plurality of protrusions 147 that form a multi-joint structure. The protrusions 147 may protrude toward the first structure 120 in a state in which the second structure 140 surrounds the first structure 120. For example, in a state in which at least some of the protrusions 147 make contact with the first roller member 132, the protrusions 147 may rotate and/or linearly move as the second structure 140 slides.

In an embodiment, the protrusions 147 may have a predetermined length in a direction (e.g., the Y-axis direction) perpendicular to the sliding direction of the second structure 140. The protrusions 147 may be spaced apart from each other by a predetermined gap in a direction (e.g., the X-axis direction) substantially parallel to the sliding direction of the second structure 140. Meanwhile, although not illustrated, according to another embodiment, the second support portion 142 may include a flexible film (not illustrated) that extends from and/or connects to one side of the first support portion 141, and the protrusions 147 may be disposed on one surface of the flexible film. In this case, the display module 150 may be disposed on an opposite surface of the flexible film that faces away from the one surface of the flexible film.

In an embodiment, the display module 150 may be formed to be flexible so as to at least partially form a curved surface. For example, the display module 150 may be formed such that at least a partial region is bent and one part at least partially faces another part accordingly. The display module 150 may include, for example, a flexible display or a foldable display. According to an embodiment to which the disclosure is applied, the entire region of the display module 150 may be formed of a flexible material. Alternatively, one partial region of the display module 150 may be formed of a flexible material, and another partial region of the display module 150 may be formed of a non-flexible material that is not bent.

In an embodiment, the display module 150 may include the first region 151, the second region 152, and the third region 153. The second region 152 may extend from the first region 151, and the third region 153 may extend from the second region 152. A display region of the display module 150 on which a predetermined screen is displayed may be changed based on an area visually exposed on the front surface and/or the rear surface of the electronic device 100. For example, in the first state, the first region 151 may be visually exposed on the front surface of the electronic device 100, and the second region 152 may be visually exposed on the rear surface of the electronic device 100. In the second state, the first region 151 and the second region 152 may be visually exposed on the front surface of the electronic device 100.

In an embodiment, the display module 150 may be disposed on the second structure 140 and may move together with the second structure 140, relative to the first structure 120 and the case 110. For example, the first region 151 may be partially fixed to the first support portion 141 and the second support portion 142, and the second region 152 and the third region 153 may be fixed to the second support portion 142. The positions and/or deformation of the regions (e.g., the first region 151, the second region 152, and the third region 153) of the display module 150 depending on operational states (e.g., the first state and the second state) of the electronic device 100 will be described below in more detail with reference to FIG. 4.

In an embodiment, at least a portion of the periphery of the third region 153 of the display module 150 or a rear surface of the third region 153 may be a portion electrically connected to the circuit board 190. For example, at least a portion of the periphery of the third region 153 of the display module 150 may extend in one direction (e.g., the +X-axis direction) and may be electrically connected to the circuit board 190. In another example, the display module 150 may include a connector 155 disposed on the rear surface of the third region 153 of the display module 150 and may be electrically connected to the circuit board 190 through a flexible printed circuit board (FPCB) (not illustrated) that is electrically connected to the connector 155.

In an embodiment, a driver (not illustrated) for driving light emitting elements (e.g., OLEDs) included in the display module 150 may be disposed on the rear surface of the third region 153 of the display module 150 or an extension of the third region 153. The driver may include a drive circuit and may have a chip on film (COF) structure. As a part is disposed on the rear surface of the third region 153 of the display module 150 or the extension of the third region 153, the distance from the circuit board 190 may be decreased, and thus electrical noise may be reduced.

In an embodiment, the back cover 160 may be disposed under the support member 110-3 (e.g., in the −Z-axis direction). The back cover 160 may include the window region 162 formed of a transparent or translucent material and the opaque region 163 surrounding the periphery of the window region 162. For example, when the rear surface of the electronic device 100 is viewed in the first state (e.g., the state of FIG. 1), the window region 162 may allow the second region 152 of the display module 150 to be visually exposed on the rear surface (or, the back cover 160) of the electronic device 100.

In an embodiment, the circuit board 190 may be disposed between the first structure 120 and the back cover 160. For example, an upper surface of the circuit board 190 may face the second surface 122 of the first structure 120, and the lower surface of the circuit board 190 may face the opening region 111 of the support member 110-3 and/or the back cover 160. Here, the upper surface of the circuit board 190 may refer to a surface substantially facing the +Z-axis direction or a surface facing toward the first structure 120, and the lower surface may refer to a surface facing away from the upper surface.

In an embodiment, various electronic parts included in the electronic device 100 may be electrically connected to the circuit board 190. The circuit board 190 may include a printed circuit board (PCB) and/or a flexible printed circuit board (FPCB).

In an embodiment, a processor (e.g., a processor 320 of FIG. 11), a memory (e.g., a memory 330 of FIG. 11), and/or an interface (e.g., an interface 377 of FIG. 11) may be mounted on the circuit board 190. For example, the processor (e.g., the processor 32 of FIG. 11) may include a main processor (e.g., a main processor 321 of FIG. 11) and/or an auxiliary processor (e.g., an auxiliary processor 323 of FIG. 11), and the main processor (e.g., the main processor 321 of FIG. 11) and/or the auxiliary processor (e.g., the auxiliary processor 323 of FIG. 11) may include one or more of a central processing unit, an application processor, a graphic processing unit, an image signal processor, a sensor hub processor, or a communication processor. For example, the memory may include a volatile memory or a nonvolatile memory. For example, the interface may include a high definition multimedia interface (HDMI), a universal serial bus (USB) interface, an SD card interface, and/or an audio interface. Furthermore, the interface may electrically or physically connect the electronic device 100 with an external electronic device and may include a USB connector, an SD card/MMC connector, or an audio connector.

Figure 4A:
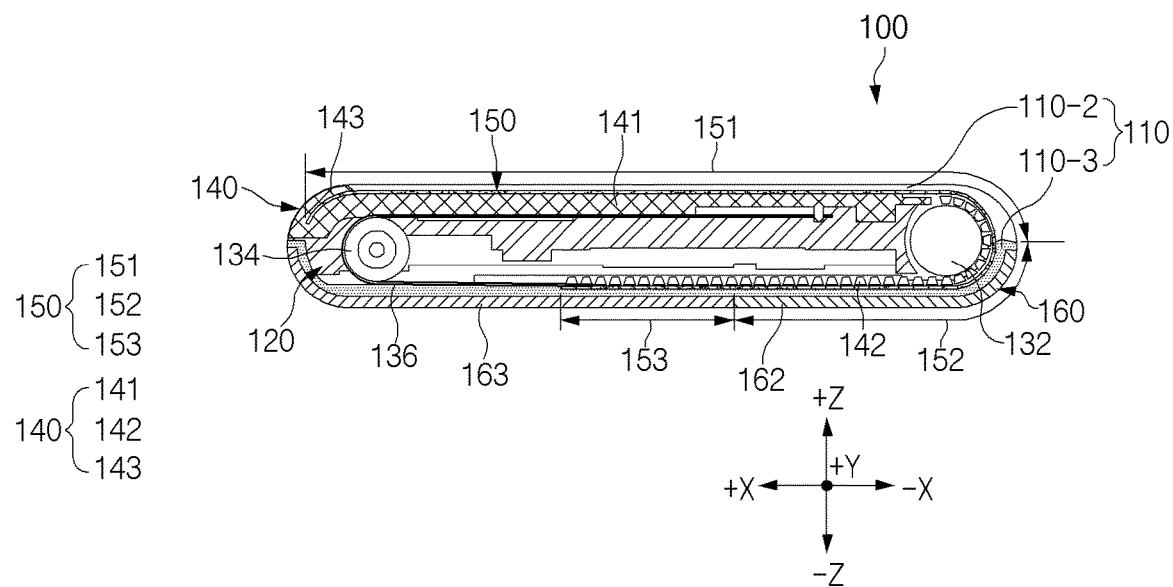
FIGS. 4A and 4B are cross-sectional views of the electronic device according to an embodiment.
Figure 4B:
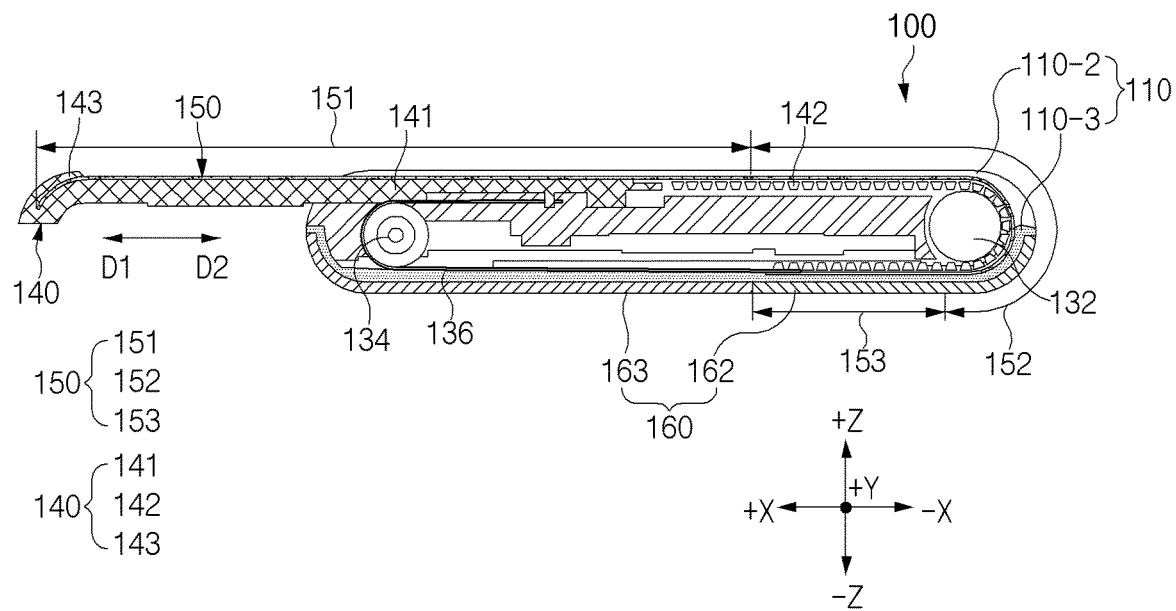

FIGS. 4A and 4B (otherwise referred to as FIG. 4) are sectional views of the electronic device according to an embodiment.

FIG. 4A is a sectional view illustrating the first state of the electronic device, and FIG. 4B is a sectional view illustrating the second state of the electronic device. FIG. 4 illustrates a section taken along line A-A' of FIG. 3.

Referring to FIG. 4, the electronic device 100 according to an embodiment may include the case 110, the first structure 120, the second structure 140, the display module 150, and the back cover 160. Meanwhile, at least some of the components of the electronic device 100 illustrated in FIG. 4 are identical or similar to the components of the electronic device 100 described with reference to FIGS. 1 to 3, and therefore repetitive descriptions will hereinafter be omitted.

According to an embodiment, the first structure 120 may include the first roller member 132, the second roller member 134, and the belt member 136. The second structure 140 may include the first support portion 141 and the second support portion 142 extending from the first support portion 141 and may be slidably connected to the first structure 120 so as to slide. The display module 150 may include the first region 151, the second region 152 extending from the first region 151, and the third region 153 extending from the second region 152 and may be disposed on at least one surface of the second structure 140. The back cover 160 may include the window region 162 and the opaque region 163 extending from the window region 162.

In an embodiment, the second structure 140 may be disposed to surround at least a portion of the first structure 120. For example, at least one portion of the second structure 140 may be disposed over the first structure 120 (e.g., in the +Z-axis direction), and another portion of the second structure 140 may be disposed under the first structure 120 (e.g., in the −Z-axis direction).

In an embodiment, the first support portion 141 of the second structure 140 may be disposed over the first structure 120 (e.g., in the +Z-axis direction), and at least part of the second support portion 142 may be disposed under the first structure 120 (e.g., in the −Z-axis direction).

In an embodiment, at least part of the second support portion 142 may be disposed in a space between the first structure 120 and the back cover 160. The area of the second support portion 142 disposed between the first structure 120 and the back cover 160 may vary depending on operational states (e.g., the first state and the second state) of the electronic device 100. For example, as the second structure 140 slides, at least part of the second support portion 142 may be inserted into or withdrawn from the space between the first structure 120 and the back cover 160. In an embodiment, the display module 150 may move together with the second structure 140. For example, as the second structure 140 slides, at least a portion of the second region 152 of the display module 150, together with the second support portion 142, may be withdrawn from or inserted into the space between the first structure 120 and the back cover 160. As the second region 152 is withdrawn and/or inserted by the sliding of the second structure 140, a portion of the second region 152 where a curved surface is formed may move. For example, in the first state, the curved surface may be formed on one end portion of the second region 152 connected with the first region 151 (e.g., FIG. 4A), and in the second state, the curved surface may be formed on an opposite end portion of the second region 152 connected with the third region 153 (e.g., FIG. 4B). The curved surface may move in the direction from the one end portion to the opposite end portion of the second region 152 in a process in which the electronic device 100 is changed from the first state to the second state.

In an embodiment, when at least a portion of the second region 152 is withdrawn from between the first structure 120 and the back cover 160, the display region visually exposed on the front surface (e.g., a surface facing the +Z-axis direction) of the electronic device 100 may be expanded. In contrast, when the at least a portion of the second region 152 is inserted between the first structure 120 and the back cover 160, the display region visually exposed on the front surface of the electronic device 100 may be reduced.

In an embodiment, the second structure 140 may be slidably connected to the first structure 120 by the first roller member 132, the second roller member 134, and the belt member 136. Referring to FIG. 3, a portion of the second roller member 134 may protrude outside the first structure 120, so as to be exposed at a front side of the first structure 120.

In an embodiment, the second support portion 142 may be disposed to surround (or extend along) at least a portion of the first roller member 132, and the belt member 136 may be disposed to surround (or extend along) at least a portion of the second roller member 134. The first roller member 132 and the second roller member 134 may be disposed so as to be rotatable relative to the first structure 120 (e.g., the first structure 120 of FIG. 3). The rollers may rotate about a rotation axis extended along the Y-axis direction. In this case, the opposite end portions of the belt member 136 may be respectively connected to the first support portion 141 and the second support portion 142 of the second structure 140. Opposing ends of the belt member 136 may be spaced apart from each other along the second structure 140. For example, as the second structure 140 and the belt member 136 are connected with each other at two locations, and the first roller member 132 and the second roller member 134 are disposed between the second structure 140 and the belt member 136, the second structure 140 and the belt member 136 may be slid by rotation of the first roller member 132 and the second roller member 134. In an embodiment, other components of the electronic device 100 (e.g., the circuit board 190 of FIG. 3) may be disposed in a space between the belt member 136 and the second structure 140.

In an embodiment, the electronic device 100 may include the first state (e.g., the state of FIG. 1) and the second state (e.g., the state of FIG. 2). For example, the electronic device 100 may be changed to the first state or the second state as the second structure 140 and the display module 150 move in the first direction D1 or the second direction D2 relative to the case 110, the first structure 120, and the back cover 160. In this case, the first state and the second state of the electronic device 100 may be determined depending on the positions of the second structure 140 and the display module 150, relative to other components of the electronic device 100.

In an embodiment, when the electronic device 100 is in the first state, the electronic device 100 may be changed to the second state by sliding at least a portion (e.g., the first support portion 141) of the second structure 140 in the first direction D1. In contrast, when the electronic device 100 is in the second state, the electronic device 100 may be changed to the first state by sliding at least a portion (e.g., the first support portion 141) of the second structure 140 in the second direction D2.

In an embodiment, the first peripheral portion 143 of the second structure 140 may be brought into contact with or spaced apart from the second side member 110-2 of the case 110, as the second structure 140 slides. For example, in the first state, the first peripheral portion 143 may make contact with the second side member 110-2 to form substantially the same plane (e.g., a single planar surface, refer to FIG. 1), and in the second state, the first peripheral portion 143 may be spaced apart from the second side member 110-2 in the first direction D1 (e.g., refer to FIG. 2). In an embodiment, the second side member 110-2 may further protrude in the +Z-axis direction by a specified height beyond a partial region of the display module 150 that faces toward the front surface of the electronic device 100. For example, in the first state, the second side member 110-2 may be formed to be higher than a portion of the first region 151 in the +Z-axis direction, and in the second state, the second side member 110-2 may be formed to be higher than the first region 151 and a portion of the second region 152 in the +Z-axis direction. Although FIG. 4 illustrates the section taken along line A-A' of FIG. 3 and therefore the first side member (e.g., the first side member 110-1 of FIGS. 1 to 3) is not illustrated in FIG. 4, the position between the second side member 110-2 and the first peripheral portion 143 and a different in height between the second side member 110-2 and the display module 150 may be identically applied to the first side member 110-1.

Referring to FIG. 4A, in an embodiment, when the electronic device 100 is in the first state, the first region 151 of the display module 150 may form a display region visually exposed on the front surface of the electronic device 100, and at least a portion of the second region 152 may be disposed between the first structure 120 and the back cover 160 and may face the rear direction of the electronic device 100 (e.g., the +Z-axis direction). In this case, at least a portion of the second regions 152 may be disposed to face the window region 162 of the back cover 160, and at least a portion of the third region 153 may be disposed to face the opaque region 163 of the back cover 160. For example, when the electronic device 100 is viewed in the rear direction, at least a portion of the second region 152 may be visually exposed on the rear surface of the electronic device 100 through the window region 162, and the third region 153 may be hidden by the opaque region 163 and may not be visually exposed.

According to an embodiment, in the first state, the first region 151 of the display module 150 may form a display region visually exposed on the front surface of the electronic device 100, and the second region 152 may form a display region visually exposed on the rear surface of the electronic device 100. For example, the second region 152 visually exposed on the rear surface of the electronic device 100 through the window region 162 of the back cover 160 in the first state may be configured to receive a touch input from the outside, or may be configured to display a predetermined screen (e.g., provide a display screen at which an image is displayed). Portions of the first region 151 and the second region 152 may face outward laterally at a side of the electronic device 100, so as to form a display region visually exposed.

Referring to FIG. 4B, in an embodiment, when the electronic device 100 is in the second state, the first region 151 and the second region 152 of the display module 150 may form a display region visually exposed on the front surface of the electronic device 100. For example, when the electronic device 100 is changed from the first state to the second state, at least a portion of the second region 152 facing the back cover 160 may be withdrawn from between the first structure 120 and the back cover 160 and/or between the first roller member 132 and the back cover 160, and may move along the lateral side of the electronic device 100 to the front side of the electronic device 100. As the electronic device 100 is changed to the second state, a portion of the second region 152 that is disposed inside the case 110 of the electronic device 100 in the first state and is not exposed, may be visually exposed on the front surface of the electronic device 100, and thus a planar area of the display region visually exposed on the front surface of the electronic device 100 may be expanded. In this case, as the second region 152 moves, at least a portion of the third region 153 may be disposed to face the window region 162. The third region 153 may prevent other components disposed in the electronic device 100 from being visually exposed through the window region 162 when the electronic device 100 is in the second state.

In another embodiment, the third region 153 of the display module 150 may be configured to be different from the first region 151 and/or the second region 152. For example, the first region 151 and the second region 152 may be configured to display a predetermined screen (e.g., provide a display screen, a display region and/or a display area), or receive a touch input (e.g., provide a touch area), in the first state or the second state. Unlike the first region 151 and/or the second region 152, the third region 153 may serve to prevent components at the inside of the electronic device 100 from being visually exposed through the window region 162. The third region 153 may not include a component (e.g., a display panel 230) for displaying a screen and/or a component (e.g., a touch panel 220) for a touch input. However, this is illustrative, and according to an embodiment to which the disclosure is applied, the third region 153 may be configured to display a screen or receive a touch input.

Figure 5:
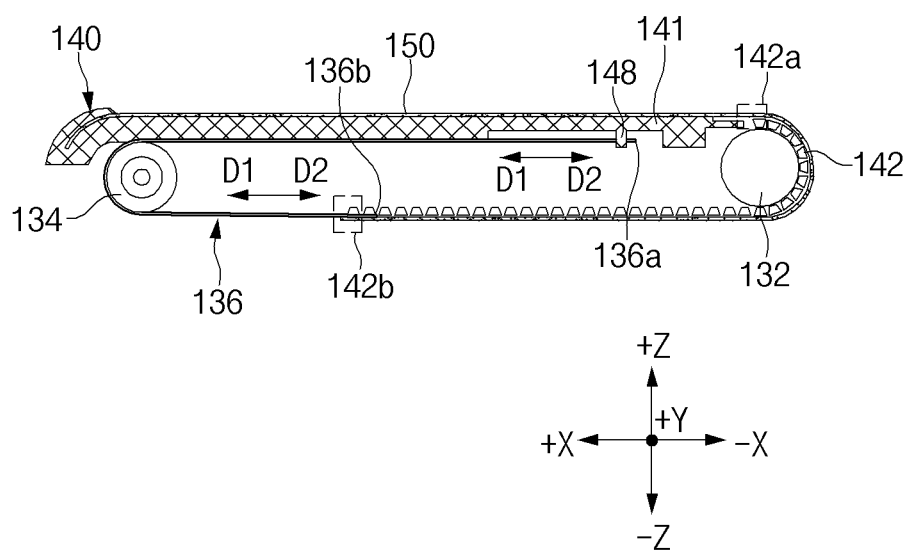
FIG. 5 is a sectional view illustrating a coupling relationship between a second structure, a first roller member, a second roller member, and a belt member of the electronic device according to an embodiment.

FIG. 5 is a sectional view illustrating a coupling relationship between the second structure, the first roller member, the second roller member, and the belt member of the electronic device according to an embodiment.

FIG. 5 may be a sectional view in which some of the components in FIG. 4 (e.g., the case, the first structure, and/or the back cover) are omitted for convenience of description, and repetitive descriptions will hereinafter be omitted.

Referring to FIG. 5, the electronic device according to an embodiment (e.g., the electronic device 100 of FIG. 4) may include the first roller member 132, the second roller member 134, the belt member 136, the second structure 140, and the display module 150.

In an embodiment, the opposite end portions 136a and 136b of the belt member 136 may be respectively connected to the first support portion 141 and the second support portion 142 of the second structure 140, such as being fixedly connected thereto. For example, the one end portion 136a (e.g., a first end portion) of the belt member 136 may be connected to a coupling protrusion 148 of the first support portion 141. The opposite end portion 136b (e.g., a second end portion) of the belt member 136 may be connected to at least part of the second support portion 142. The opposite end portion 136b of the belt member 136 may be fixedly disposed between the second support portion 142 and the display module 150.

In an embodiment, the belt member 136 may be connected to the first support portion 141 and the second support portion 142 and may provide tension to pull one end of the second support portion 142 with respect to the first support portion 141. For example, the belt member 136 may be disposed between the first support portion 141 and the second support portion 142 and may allow the second support portion 142 to remain in a tight state, by pulling a second edge 142b of the second support portion 142 in a direction (e.g., the +X-axis direction) opposite to a direction toward a first edge 142a of the second support portion 142. Accordingly, the second support portion 142 formed to be bendable may remain in the tight state and may stably support the display module 150.

As the first support portion 141 and the second support portion 142 are connected to each other by the belt member 136, the first edge 142a and the second edge 142b of the second support portion 142 may move along the sliding direction, while maintaining a predetermined gap when the second structure 140 slides. For example, when the first edge 142a moves in the first direction D1 as the second structure 140 slides, the second edge 142b may move in the second direction D2. In contrast, when the first edge 142a moves in the second direction D2, the second edge 142b may move in the first direction D1.

In an embodiment, the first roller member 132 and the second roller member 134 may form a first rotational axis and a second rotational axis that extend in a direction substantially perpendicular to the sliding direction of the second structure 140 (e.g., the first direction D1 or the second direction D2). The first roller member 132 and the second roller member 134 may rotate about the respective rotational axes (e.g., the first rotational axis and the second rotational axis) in the clockwise or counterclockwise direction depending on the sliding direction of the second structure 140 (e.g., the first direction D1 or the second direction D2) when the second structure 140 slides. For example, when the first support portion 141 moves in the first direction D1, the first roller member 132 and the second roller member 134 may rotate in the counterclockwise direction. In contrast, when the first support portion 141 moves in the second direction D2, the first roller member 132 and the second roller member 134 may rotate in the clockwise direction. When the first support portion 141 moves, the first roller member 132 and the second roller member 134 may rotate together, and the second support portion 142 and the belt member 136 may move.

In an embodiment, the opposite end portions 136a and 136b of the belt member 136 may be moved in opposite directions by the first roller member 132 and the second roller member 134 when the second structure 140 slides. For example, when the first support portion 141 moves in the first direction D1, the one end portion 136a of the belt member 136 may move in the first direction D1, and the opposite end portion 136b of the belt member 136 may move in the second direction D2. In contrast, when the first support portion 141 moves in the second direction D2, the one end portion 136a of the belt member 136 may move in the second direction D2, and the opposite end portion 136b of the belt member 136 may move in the first direction D1.

Figure 6A:
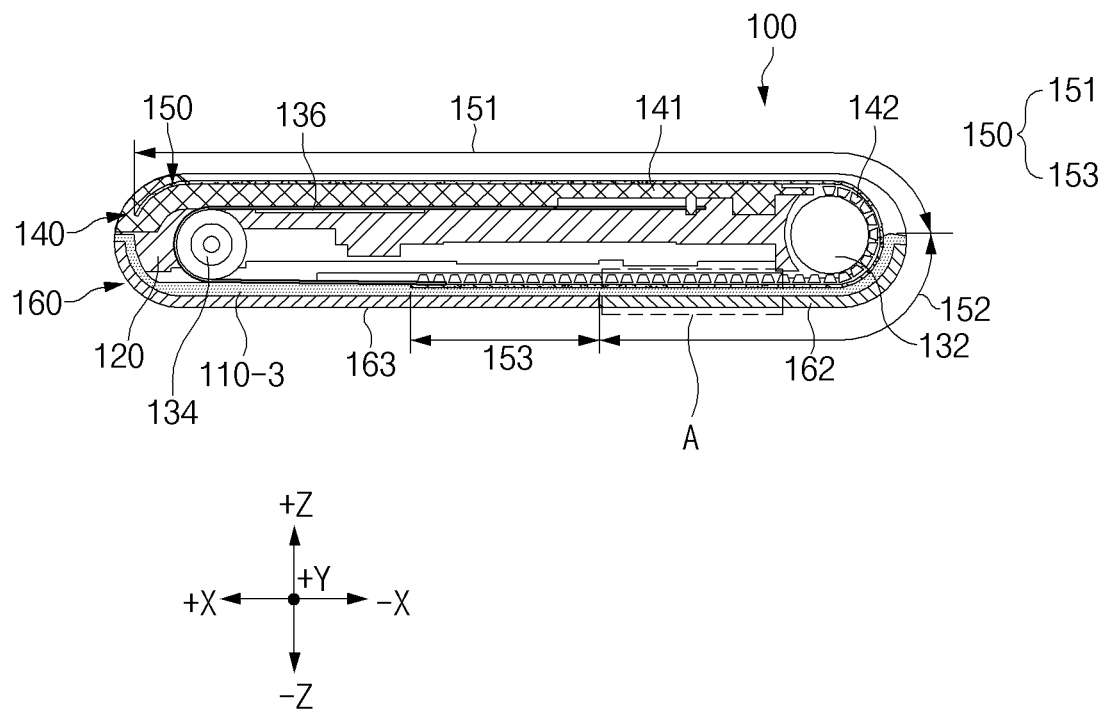
FIGS. 6A and 6B illustrate an operation in which a touch is input through a back cover in the first state of the electronic device according to an embodiment.
Figure 6B:
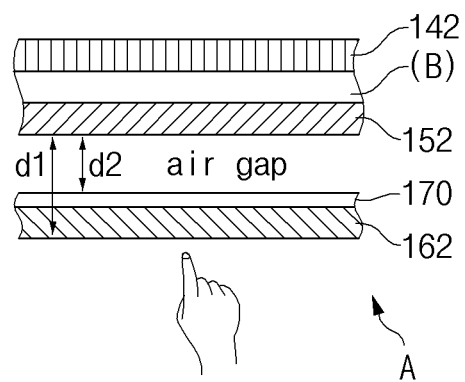
Figure 7A:
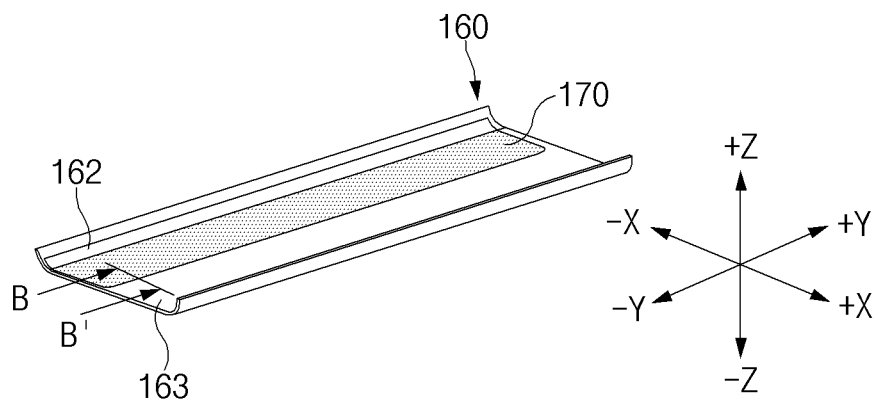
FIGS. 7A to 7C illustrate the back cover of the electronic device according to an embodiment.
Figure 7B:
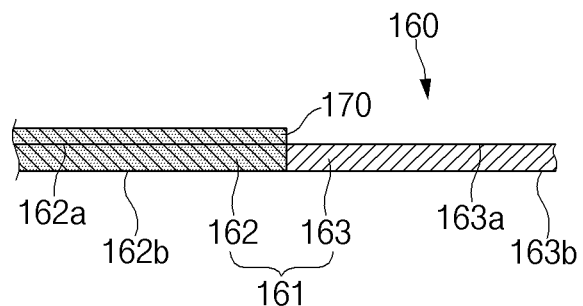
Figure 7C:
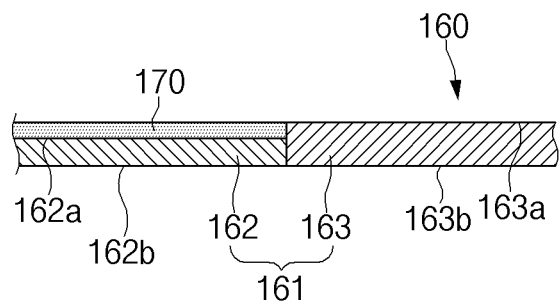

FIGS. 6A and 6B (otherwise referred to as FIG. 6) illustrate an operation in which a touch is input through the back cover in the first state of the electronic device according to an embodiment. FIG. 6B is an enlarged view of region A shown in FIG. 6A. FIGS. 7A, 7B and 7C (otherwise referred to as FIG. 7) illustrate the back cover of the electronic device according to an embodiment. FIGS. 7B and 7C illustrate a section taken along line B-B' of FIG. 7A.

Referring to FIGS. 6 and 7, the electronic device 100 according to an embodiment may include the first structure 120, the second structure 140, the display module 150, and the back cover 160.

In an embodiment, the second structure 140 may include the first support portion 141 and the second support portion 142 which extends from the first support portion 141. The display module 150 may include the first region 151, the second region 152, and the third region 153 and may be disposed to surround at least a portion of the second structure 140 and configured to be movable together with the second structure. The back cover 160 may be disposed under the support member 110-3 (e.g., in the −Z-axis direction) and may form the rear surface of the electronic device 100. Meanwhile, at least some of the components of the electronic device 100 illustrated in FIGS. 6 and 7 are identical or similar to the components of the electronic device 100 described with reference to FIGS. 1 to 5. Therefore, repetitive descriptions will hereinafter be omitted.

According to an embodiment, as described above, the electronic device 100 may be configured such that a touch input is applied to a partial region of the display module 150 visually exposed through the window region 162 in the rear direction of the electronic device 100 (e.g., the −Z-axis direction) in the first state (e.g., the state of FIG. 1 and the state of FIG. 4A).

In an embodiment, when the electronic device 100 is in the first state, a touch input may be applied to the front display region (e.g., at least a portion of the first region 151 of the display module 150) visually exposed in the front direction of the electronic device 100 (e.g., the +Z-axis direction). Furthermore, a touch input may be applied to the rear display region (e.g., at least a portion of the second region 152 of the display module 150) visually exposed in the rear direction of the electronic device 100 (e.g., the −Z-axis direction).

In an embodiment, in the first state of the electronic device 100, at least a portion of the second region 152 of the display module 150 may be disposed to face the window region 162 of the back cover 160. For example, at least a portion of the second region 152 may be visually exposed on the rear surface of the electronic device 100 through the window region 162 formed to be transparent or translucent. The electronic device 100 may be configured such that a predetermined screen and/or image displayed on the second region 152 in the first state is visually exposed on the rear surface of the electronic device 100 as the window region 162 is formed in the back cover 160. Furthermore, the electronic device 100 may be configured such that a touch input by an external input is applied to the second region 152 in the first state.

According to an embodiment, a conductive layer 170 may be disposed on at least a portion of the back cover 160 to increase the sensitivity of a touch input applied to the second region 152 and improve touch recognition when the electronic device 100 is in the first state.

In an embodiment, the back cover 160 may include a cover layer 161 including the window region 162 formed to be transparent or translucent and the opaque region 163, and the conductive layer 170 disposed on at least a portion of the window region 162.

In an embodiment, the cover layer 161 may form the rear surface of the electronic device 100. For example, a lower surface (e.g., 162*b* and 163*b*) (e.g., a surface facing the −Z-axis direction) of the cover layer 161 may be exposed outside the electronic device 100 and may form an outer surface of the electronic device 100 (e.g., the rear surface of the electronic device 100). An upper surface (e.g., 162*a* and 163*a*) (e.g., a surface facing the +Z-axis direction) of the cover layer 161 that faces away from the lower surface (e.g., 162*b* and 163*b*) may face toward the inside of the electronic device 100. For example, the upper surface (e.g., 162*a* and 163*a*) of the cover layer 161 may face the support member 110-3 and/or at least a portion of the display module 150.

In an embodiment, the cover layer 161 may include the window region 162 formed to be transparent or translucent and the opaque region 163 extending from the window region 162. For example, the cover layer 161 may be entirely formed of a transparent or translucent material, and the window region 162 and the opaque region 163 may be formed by printing a specified color or pattern on a partial region or attaching a film thereto. The cover layer 161 may be manufactured through an injection molding process. However, a manufacturing method of the cover layer 161 is not limited thereto. In another embodiment, a region in which the transparent window region 162 and the opaque region 163 are connected with each other (e.g., a boundary between the window region 162 and the opaque region 163) may be processed in the form of a gradation, and thus the window region 162 and the opaque region 163 may be naturally connected.

In an embodiment, the cover layer 161 may be formed such that the window region 162 and the opaque region 163 have the same thickness or different thicknesses. FIGS. 7B and 7C illustrate sectional views of the back cover 160 according to different embodiments.

According to the embodiment illustrated in FIG. 7B, the window region 162 and the opaque region 163 may have the same thickness. The upper surface 162*a* of the window region 162 and the upper surface 163*a* of the opaque region 163 may form substantially the same plane (e.g., may be coplanar with each other). The lower surface 162*b* of the window region 162 and the lower surface 163*b* of the opaque region 163 may form substantially the same plane. The conductive layer 170 may be disposed on the upper surface 162*a* of the window region 162. The conductive layer 170 may further protrude in the +Z-axis direction by a predetermined height relative to the upper surface 163*a* of the opaque region 163. The conductive layer 170 may formed a step with the opaque region 163 of the back cover 160

According to the embodiment illustrated in FIG. 7C, the window region 162 and the opaque region 163 may have different thicknesses and may be formed to have a step accordingly. For example, the window region 162 may be formed to be thinner than the opaque region 163. The upper surface 162*a* of the window region 162 and the upper surface 163*a* of the opaque region 163 may be connected with each other to form a step. The lower surface 162*b* of the window region 162 and the lower surface 163*b* of the opaque region 163 may form substantially the same plane. The conductive layer 170 may be disposed on the upper surface 162*a* of the window region 162. The thickness of the conductive layer 170 may be substantially the same as a difference in thickness between the window region 162 and the opaque region 163. The upper conductive surface of the conductive layer 170 may form substantially the same plane as the upper surface 163*a* of the opaque region 163.

In an embodiment, the conductive layer 170 may be disposed between the back cover 160 (e.g., the window region 162) and the display module 150 (e.g., the second region 152) in the first state. For example, the conductive layer 170 between the window region 162 of the back cover 160 and the second region 152 of the display module 150 may perform a function of effectively transferring, to the second region 152, a change in permittivity caused by an external input unit (e.g., a finger or a stylus pen, or shown as a hand in FIG. 6B) brought into contact with the window region 162. In another embodiment, the conductive layer 170 may be formed as a partial region of the cover layer 161. For example, the conductive layer 170 may be disposed inside the cover layer 161 without distinction of the conductive layer 170 and the cover layer 161 and thus may form one of a plurality of layers included in the cover layer 161. In the other embodiment, the conductive layer 170 may be located inside the back cover 160 without being exposed outside the back cover 160.

In an embodiment, the conductive layer 170 may include a patterned conductive material. For example, the conductive layer 170 may include at least one electrode pattern (e.g., an electrode pattern 171, 173, or 175 of FIG. 10). The electrode pattern 171, 173, or 175 may be formed in various forms and/or shapes to correspond to a touch pattern of the display module 150 (e.g., a pattern of driving electrodes 222 and/or a pattern of sensing electrodes 224 of FIG. 10). The electrode pattern 171, 173, or 175 of the conductive layer 170 and the touch pattern of the display module 150 will be described below with reference to FIGS. 9 and 10.

In an embodiment, the conductive layer 170 may be disposed on the back cover 160, at the window region 162. For example, the conductive layer 170 may be disposed on the upper surface (e.g., 162a and 163a) (e.g., a surface facing the +Z-axis direction) of the cover layer 161 to face toward the inside of the electronic device 100. The conductive layer 170 may be located to at least partially overlap the window region 162. In another embodiment, the conductive layer 170 may be located to overlap a portion of the window region 162 and a portion of the opaque region 163. In an embodiment, the conductive layer 170 may face at least a portion of the display module 150. Furthermore, although not illustrated, the conductive layer 170 may face the opening region of the support member 110-3 (e.g., the opening region 111 of FIG. 3) or at least a portion of the circuit board (e.g., the circuit board 190 of FIG. 3) (e.g., refer to FIG. 3). In an embodiment, the conductive layer 170 may be formed to be transparent or translucent so as not to be visually exposed through the window region 162. For example, the conductive layer 170 may include an electrode formed of a transparent or translucent material.

In the electronic device 100 according to an embodiment of the disclosure, the conductive layer 170 may be disposed between the back cover 160 and the display module 150 to improve the touch sensitivity of an external touch input applied through the back cover 160 and touch recognition when the electronic device 100 is in the first state (e.g., the state of FIG. 1).

In an embodiment, the conductive layer 170 and the second region 152 of the display module 150 may be disposed between the window region 162 of the back cover 160 and the second support portion 142 of the second structure 140. In this case, an adhesive member B may be disposed between the second support portion 142 and the second region 152, and an air gap (e.g., 'air gap' in FIG. 6B) may be formed between the second region 152 and the conductive layer 170. The air gap may be provided to secure a space in which the second structure 140 and the display module 150 are able to slide when the electronic device 100 is changed between the first state (e.g., the state of FIG. 1 and the state of FIG. 4A) and the second state (e.g., the state of FIG. 2 and the state of FIG. 4B). When the display module 150 moves through the air gap, a surface of the display module 150 may be prevented from being scratched or damaged by other components of the electronic device 100, owing to the air gap.

According to an embodiment, when the electronic device 100 is in the first state, the physical distance between an external input unit (e.g., a finger or a stylus pen) and the display module 150 may lower the sensitivity of a touch input. For example, the first distance d1 between the second region 152 and the external input unit may be implemented to be slightly large due to the air gap and the back cover 160 that are disposed under the second region 152 of the display module 150 (e.g., in the −Z-axis direction), and therefore the sensitivity of the touch input by the external input unit may be lowered.

In an embodiment, the conductive layer 170 disposed between the air gap and the window region 162 may be an intermediate medium capable of transferring a change in permittivity and may compensate for a decrease in the sensitivity with which the second region 152 senses an external input unit (e.g., a finger or a stylus pen).

In an embodiment, to transfer a change in the permittivity of an external input unit, the conductive layer 170 may serve to increase capacitance between an electrode (e.g., a TX electrode and/or an RX electrode) included in a touch panel (e.g., the touch panel 220 of FIG. 10) of the second region 152 and the external input unit. For example, when the external input unit is brought into contact with the back cover 160, the amount of charge may be changed while charges are introduced into the conductive layer 170 (e.g., a patterned conductive material). At this time, the change in the amount of charge in the conductive layer 170 may be sensed by the touch panel of the display module 150 (e.g., the second region 152). Accordingly, the first distance d1 between the second region 152 and the external input unit may be substantially decreased to the second distance d2 between the second region 152 and the conductive layer 170. Thus, the sensitivity of the touch panel may be improved due to the increase in the capacitance between the touch panel and the external input unit.

The electronic device 100 according to an embodiment may increase the sensitivity of a touch sensor for each region (e.g., the first region 151, the second region 152, or the third region 153) of the display module 150 depending on states of the electronic device 100. The processor of the electronic device 100 (e.g., the processor 320 of FIG. 11) may increase the touch sensitivity of the display module 150, based on operational states (e.g., the first state and the second state) of the electronic device 100 and/or the direction of the electronic device 100 (e.g., when the user looks at the front surface of the electronic device 100 and when the user looks at the rear surface of the electronic device 100).

According to an embodiment, when the user looks at the rear surface of the electronic device 100 from above in the first state, the processor (e.g., the processor 320 of FIG. 11) may recognize that the rear surface of the electronic device 100 is rotated to face a direction opposite to the direction of the earth's magnetic field, based on a rotated state of the electronic device 100 sensed through the sensor module (e.g., the sensor module 376 of FIG. 11 or a gyro sensor). In this case, the processor 320 may increase the touch sensitivity of the second region 152 visually exposed on the rear surface of the electronic device 100 through the window region 162, thereby improving the sensitivity of a touch input through the second region 152.

According to an embodiment, the third region 153 of the display module 150 may be configured to enable a touch input. For example, in the first state, a touch input may be applied to the second region 152 through the window region 162, and in the second state, a touch input may be applied to the third region 153 through the window region 162. In the above embodiment, when the electronic device 100 is changed from the first state to the second state, the processor (e.g., the processor 320 of FIG. 11) may detect the current state (e.g., the first state or the second state) of the electronic device 100 through movement of the second structure 140, the roller members (e.g., 132 and 134), and/or the belt member 136, may determine a region of the display module 150 (e.g., the second region 152 or the third region 153) located on the window region 162, and may increase the sensitivity of a touch sensor for the corresponding region. For example, when it is detected that the electronic device 100 is currently in the first state, the processor 320 may increase the touch sensitivity of the second region 152 facing the window region 162. Furthermore, when it is detected that the electronic device 100 is currently in the second state, the processor 320 may increase the touch sensitivity of the third region 153 facing the window region 162.

In the first state, the electronic device 100 according to an embodiment may separately display a user interface (UI) displayed on a display region (e.g., the first region 151) visually exposed on the front surface of the electronic device 100 and a UI displayed on a display region (e.g., the second region 152) visually exposed on the rear surface of the electronic device 100 through the window region 162. For example, in the first state, the UI displayed on the display region (e.g., the second region 152) exposed through the window region 162 may be implemented with a UI having a lower touch sensitivity than the UI displayed on the display region (e.g., the first region 151) visually exposed on the front surface of the electronic device 100. In another example, an icon (as an image) displayed on the display region visually exposed through the window region 162 may be displayed to be larger than an icon displayed through the display region visually exposed on the front surface of the electronic device 100.

Figure 8A:
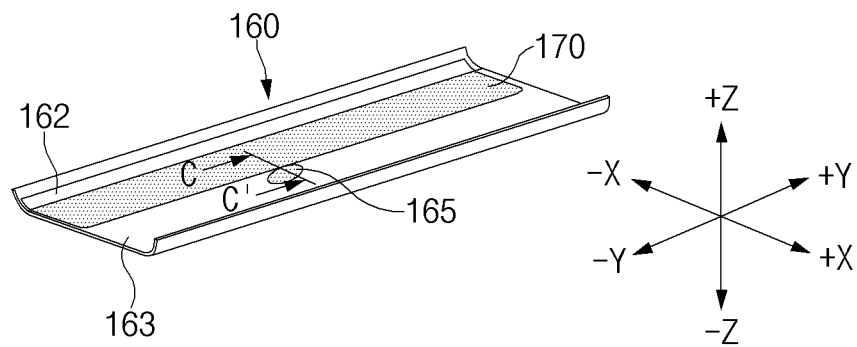
FIGS. 8A to 8C illustrate the back cover of the electronic device according to an embodiment.
Figure 8B:
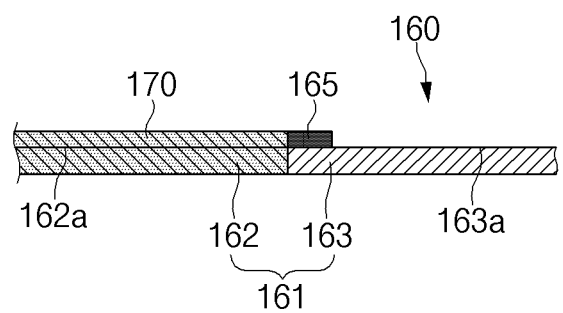
Figure 8C:
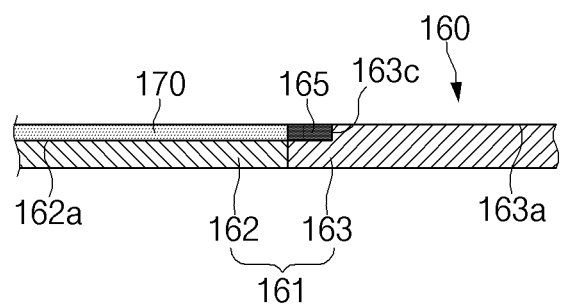

FIGS. 8A, 8B and 8C (otherwise referred to as FIG. 8) illustrate the back cover of the electronic device according to an embodiment. FIGS. 8B and 8C illustrate a section taken along line C-C' of FIG. 8A.

Referring to FIG. 8, the back cover 160 may include the cover layer 161 including the window region 162 and the opaque region 163, and the conductive layer 170 disposed on at least a portion of the window region 162. FIG. 8 is a view illustrating an embodiment in which the conductive region 165 is added to the back cover 160 according to the embodiment of FIG. 7. Hereinafter, repetitive descriptions will be omitted.

In an embodiment, the conductive layer 170 may be configured to be electrically connected with the circuit board (e.g., the circuit board 190 of FIG. 3).

In an embodiment, the conductive region 165 electrically connected with the conductive layer 170 may be formed on the opaque region 163 of the cover layer 161 (e.g., FIG. 7B). The conductive region 165 may be considered a part of the conductive layer 170, such that the conductive layer 170 is extended across a boundary between the window region 162 and the opaque region 163 of the back cover 160. The conductive region 165 may be further electrically connected to the circuit board (e.g., the circuit board 190 of FIG. 3). As described above, the opening region (e.g., the opening region 111 of FIG. 3) may be formed in the support member (e.g., the support member 110-3 of FIGS. 3, 4, and 6), and the circuit board 190 and the back cover 160 may be disposed to face each other through the opening region 111 (e.g., refer to FIG. 3). For example, a connecting member (e.g., a c-clip or a pogo-pin) for electrical connection may be disposed on the circuit board 190. The connecting member may make contact with the conductive region 165, and thus the conductive layer 170 and the circuit board 190 may be electrically connected through the conductive region 165. In another example, a connecting member (e.g., a c-clip or a pogo-pin) for electrical connection with the circuit board 190 may be located on the conductive region 165.

In an embodiment, the conductive region 165 may be connected to a ground (GND) region of the circuit board (e.g., the circuit board 190 of FIG. 3). In another embodiment, a specified potential may be connected to the conductive region 165 to determine the potential of the conductive layer 170. The electronic device 100 may reduce an influence of noise and may stably operate, by electrically connecting the conductive layer 170 and the circuit board 190 through the conductive region 165. However, the conductive region 165 does not correspond to an essential component, and according to an embodiment to which the disclosure is applied, the conductive region 165 may be omitted in a case in which the performance of the conductive layer 170 is secured even though the conductive region 165 does not exist.

In an embodiment, the conductive region 165 may be integrally formed with the conductive layer 170. For example, at least a partial region of the conductive layer 170 (e.g., the electrode pattern 173 or 175 of FIG. 9) may extend toward the opaque region 163 to form the conductive region 165. However, the disclosure is not limited thereto. The conductive region 165 may be formed to be a component separate from the conductive layer 170, and a connecting member may be disposed between the conductive region 165 and the conductive layer 170 to electrically connect the conductive region 165 and the conductive layer 170.

As described above with reference to FIG. 7, the cover layer 161 may be formed such that the window region 162 and the opaque region 163 have the same thickness or different thicknesses. FIGS. 8B and 8C illustrate sectional views of the back cover 160 along line C-C' in FIG. 8A, according to different embodiments.

In an embodiment, in the case in which the window region 162 and the opaque region 163 have the same thickness, the conductive layer 170 may be disposed on the upper surface 162a of the window region 162, and the conductive region 165 may be disposed on the upper surface 163a of the opaque region 163. For example, the conductive layer 170 and the conductive region 165 may further protrude in the +Z-axis direction by a predetermined height beyond the upper surface 163a of the opaque region 163 (e.g., refer to FIG. 8B).

In an embodiment, in a case in which the window region 162 is thinner than the opaque region 163, a step 163c may be formed on at least a portion of the opaque region 163 (e.g., a portion where the conductive region 165 is located). For example, the step 163c may be formed on a portion of the upper surface 163a of the opaque region 163 to correspond to the position in which the conductive region 165 is disposed.

The conductive layer 170 may be disposed on the upper surface 162a of the window region 162, and the conductive region 165 may be disposed on the step 163c of the opaque region 163 (e.g., refer to FIG. 8C). The conductive layer 170 and the conductive region 165 may form substantially the same plane as the upper surface 163a of the opaque region 163. In the illustrated embodiment, the conductive region 165 may have substantially the same thickness as the conductive layer 170. However, the thickness of the conductive region 165 is not limited to the illustrated embodiment, and the conductive region 165 may be formed to be thicker or thinner than the conductive layer 170.

Figure 9A:
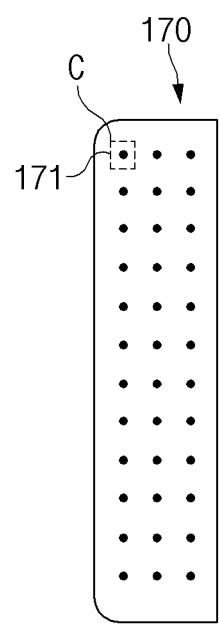
FIGS. 9A to 9G illustrate an electrode pattern of a conductive layer of the electronic device according to an embodiment.
Figure 9B:
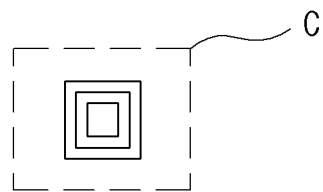
Figure 9C:
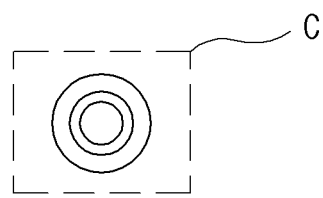
Figure 9D:
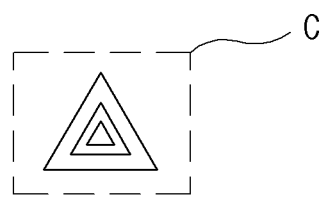
Figure 9E:
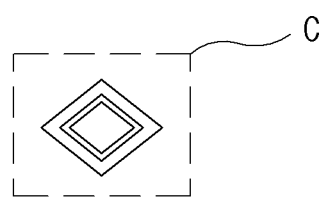

FIGS. 9A, 9B, 9C, 9D, 9E, 9F and 9G (otherwise referred to as FIG. 9) illustrate the electrode pattern of the conductive layer of the electronic device according to an embodiment. FIGS. 9B, 9C, 9D and 9D are enlarged views of region C shown in FIG. 9A.

Referring to FIG. 9, the conductive layer 170 of the electronic device according to an embodiment (e.g., the electronic device 100 of FIGS. 1 to 6) may include the electrode pattern 171, 173, or 175.

In an embodiment, the electrode pattern 171, 173, or 175 of the conductive layer 170 may be formed in various forms of patterns. For example, the electrode pattern 171, 173, or 175 may be formed in a regular pattern, or may be formed in an irregular pattern. In FIG. 9, the solid lines of the patterns may be solid portions of the conductive layer 170 which are spaced apart from each other along the conductive layer 170, without being limited thereto.

In an embodiment, the electrode pattern 171, 173, or 175 may be formed in a mesh pattern. For example, the mesh pattern may include at least one of a polygonal shape (e.g., a triangular shape like in FIG. 9D, a rectangular shape, a square shape like in FIG. 9B, a rhombic shape like in FIG. 9E, a pentagonal shape, a hexagonal shape, or an octagonal shape), a circular shape like in FIG. 9C, or a mesh shape. However, the disclosure is not limited thereto, and according to an embodiment to which the disclosure is applied, the form of the mesh pattern may be diversely modified.

In an embodiment, the mesh pattern may be formed in a form in which a plurality of figures overlap or are concentric with one another (e.g., refer to FIG. 9A). For example, the mesh pattern may include a first figure (e.g., outermost pattern) having a specified form and a plurality of figures (e.g., a plurality of inner patterns) disposed in the first figure. In this case, the plurality of figures disposed in the first figure may have a decreasing size toward the inside of the first figure and may be spaced apart from one another by a predetermined gap or different gaps.

In an embodiment, a first quadrangular pattern may be disposed, and a second quadrangular pattern smaller than the first quadrangular pattern may be disposed in the first quadrangular pattern. In addition, a third quadrangular pattern smaller than the second quadrangular pattern may be disposed in the second quadrangular pattern. In another embodiment, the plurality of figures may have a pyramid shape (e.g., a triangular pyramid, a quadrangular pyramid, a pentagonal pyramid, a hexagonal pyramid, an octagonal pyramid, or a circular pyramid). The number and shape of figures disposed to overlap one another may be diversely modified. The mesh pattern having the above-described form may form predetermined points to concentrate charges transferred through the conductive layer 170 toward the inside of the figures constituting the mesh pattern, thereby further improving the sensitivity of a touch input received through the conductive layer 170 and the window region (e.g., the window region 162 of FIGS. 5 and 6).

In an embodiment, the electrode pattern 173 or 175 may include at least one of a straight line, a curved line, or a closed curve formed of a straight line or a curved line.

Figure 9F:
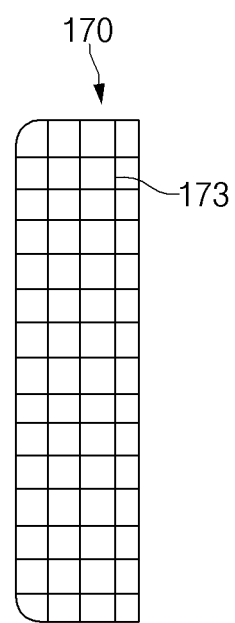

In an embodiment, the electrode pattern 173 or 175 may be formed in a grid form in which a plurality of straight lines intersect one another at a right angle (e.g., refer to FIG. 9F). In this case, a mesh pattern having a form in which a plurality of figures overlap one another may be disposed at points where the plurality of straight lines intersect one another. For example, the mesh patterns illustrated in FIG. 9A may be configured to be connected with together.

Figure 9G:
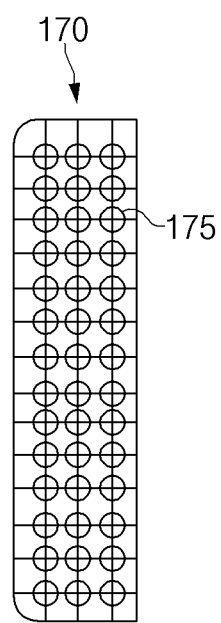

In an embodiment, the electrode pattern 175 may be formed in a form in which a plurality of straight lines and a plurality of closed curves intersect one another (e.g., refer to FIG. 9G). For example, the electrode pattern 175 may be formed in a form in which closed curves (e.g., circles) surround points where a plurality of straight lines intersect one another in a pattern having a grid form.

In an embodiment, the electrode pattern 171, 173, or 175 may include a metal electrode pattern (e.g., a metal mesh pattern) having a mesh shape. A metal that forms the metal mesh pattern may be a metal having electrical conductivity, and the type of metal is not particularly limited. For example, a conductive metal, such as Pt, Ru, Au, Ag, Mo, Al, W, Pd, Mg, Ni, Nd, Ir, Cr, Ti, or Cu, or a metal alloy may be used as a metallic material. According to an embodiment, the electrode pattern 171, 173, or 175 may be implemented using silver (Ag) or copper (Cu) transparent ink.

In an embodiment, the electrode pattern 171, 173, or 175 may include an electrode formed of a transparent or translucent material. The electrode pattern 171, 173, or 175 formed to be transparent or translucent may be implemented using a transparent electrode material known in the art, and the material of the electrode is not particularly limited. For example, the electrode pattern 171, 173, or 175 may be implemented using a transparent conductive material including indium tin oxide (ITO), indium zinc oxide (IZO), zinc oxide (ZnO), indium zinc tin oxide (IZTO), cadmium tin oxide (CTO), poly(3,4-ethylenedioxythiophene) (PEDOT), Al-doped ZnO (AZO), carbon nano tubes (CNT), graphene, and/or metal wires (e.g., silver nano wires (AGNW)). A metal used in the metal wires is not particularly limited, and these may be used alone or in combination of two or more. Alternatively, the electrode pattern 171, 173, or 175 may include an electrode pattern formed of ITO. In an embodiment, the electrode pattern 171, 173, or 175 may be implemented using various methods known in the art. The electrode pattern 171, 173, or 175 may be formed by various thin film deposition technologies including physical vapor deposition (PVD) or chemical vapor deposition (CVD). For example, the electrode pattern 171, 173, or 175 may be formed by reactive sputtering that is an example of the physical vapor deposition. Alternatively, the electrode pattern 171, 173, or 175 may be formed by photolithography.

Furthermore, the electrode pattern 171, 173, or 175 may be formed through various types of printing processes. For example, various printing methods including gravure off set, reverse off set, screen printing, or gravure printing may be used. When the electrode pattern 171, 173, or 175 is formed by the above printing processes, the electrode pattern 171, 173, or 175 may be formed using a printable paste material.

According to an embodiment, when the conductive layer 170 and/or the electrode pattern 171, 173, or 175 is formed to be thick, the permittivity may increase, and thus an effect of improving the sensitivity of a touch input may be increased.

Figure 10A:
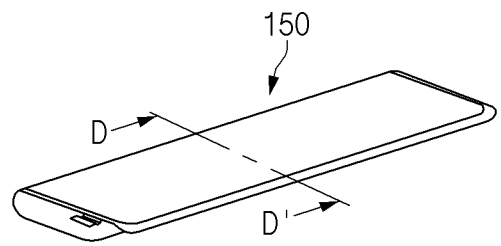
FIGS. 10A to 10E illustrate a display module of the electronic device according to an embodiment.
Figure 10B:
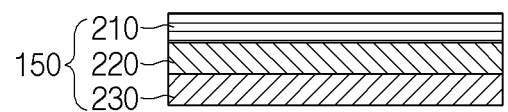
Figure 10C:
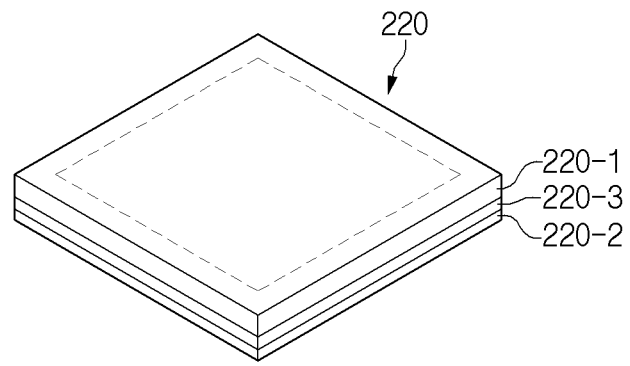
Figure 10D:
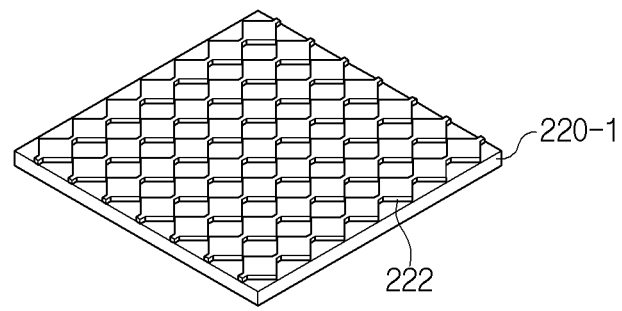
Figure 10E:
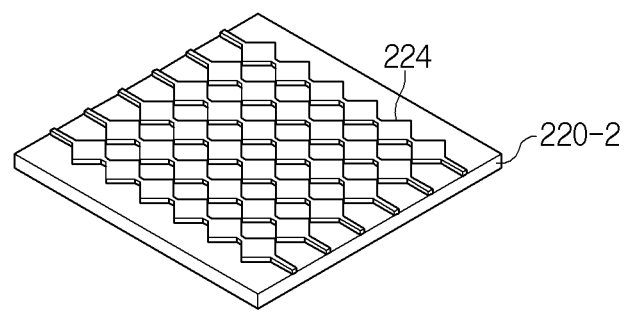

FIGS. 10A, 10B, 10C, 10D and 10E (otherwise referred to as FIG. 10) illustrate the display module of the electronic device according to an embodiment. FIG. 10B illustrates a section taken along line D-D' of FIG. 10A.

Referring to FIG. 10, the display module 150 of the electronic device 100 according to an embodiment may include a window panel 210, the touch panel 220, and the display panel 230.

The embodiment of FIG. 10 is merely an example, and a configuration of the display module 150 is not necessarily limited to the illustrated embodiment. According to an embodiment to which the disclosure is applied, the display module 150 may be implemented using various types and forms of displays.

In an embodiment, the window panel 210 may form an outer surface of the display module 150 and may protect the touch panel 220 or the display panel 230. The window panel 210 may be formed of at least one of glass, poly carbonate (PC), poly methyl meth acrylate (PMMA), or polyimide (PI), or a combination of two or more thereof.

In an embodiment, the touch panel 220 may be disposed facing the window panel 210, between the window panel 210 and the display panel 230. The touch panel 220 may be formed of a light transmitting material and may transmit an image signal displayed through the display panel 230.

In an embodiment, the touch panel 220 may sense the position, intensity, and/or duration of a touch input by using capacitance varying depending on an external input such as a user's touch input. The touch panel 220 may include a first layer 220-1, a second layer 220-2, and an insulating layer 220-3 located between the first layer 220-1 and the second layer 220-2. However, the disclosure is not necessarily limited to the illustrated embodiment, and the touch panel 220 may be integrally formed without being divided into separate layers.

In an embodiment, each of the first layer 220-1 and the second layer 220-2 may include a touch pattern for recognizing a touch operation of the user. For example, the touch pattern may be formed by the plurality of driving electrodes 222 and the plurality of sensing electrodes 224.

In an embodiment, the first layer 220-1 may include the pattern of the driving electrodes 222 (e.g., TX electrodes). The second layer 220-2 may include the pattern of the sensing electrodes 224 (e.g., RX electrodes). For example, the driving electrodes 222 and the sensing electrodes 224 may be disposed to cross each other in directions perpendicular to each other. The driving electrodes 222 and the sensing electrodes 224 may be disposed to cross each other in a net form, a grid form, or a matrix form. However, the form of the touch pattern (e.g., the pattern of the driving electrodes 222 and the pattern of the sensing electrodes 224) is not necessarily limited thereto, and the touch pattern by the driving electrodes 222 and the sensing electrodes 224 may be modified in various forms.

Meanwhile, without being necessarily limited to the illustrated embodiment, the touch panel 220 may be diversely modified according to an embodiment to which the disclosure is applied. For example, the first layer 220-1 may include the sensing electrodes 224, and the second layer 220-2 may include the driving electrodes 222.

In an embodiment, the display panel 230 may be disposed between the touch panel 220 and the second structure (e.g., the second structure 140 of FIGS. 3, 4, and 6). The display panel 230 may display an image in response to an electrical signal inside the electronic device 100. The display panel 230 may be implemented with a liquid crystal display (LCD) panel or an organic light emitting diode (OLED) panel.

Meanwhile, although not illustrated, an adhesive layer (not illustrated) may be disposed between the panels (e.g., the window panel 210, the touch panel 220, and the display panel 230). In an embodiment, the adhesive layer may bond the panels such that the panels are not separated from each other. For example, the adhesive layer may include an optical clear adhesive (OCA) and/or a synthetic resin.

Hereinafter, an interrelation of the electrode pattern (e.g., the electrode pattern 171, 173, or 175 of FIG. 9) and the touch pattern (e.g., the pattern of the driving electrodes 222 and/or the pattern of the sensing electrodes 224) will be described with reference to FIG. 9 described above.

Referring to FIGS. 9 and 10, the conductive layer 170 of the electronic device according to an embodiment (e.g., the electronic device 100 of FIGS. 1 to 6) may include the electrode pattern 171, 173, or 175. Furthermore, the display module 150 of the electronic device 100 may include the touch panel 220 in which the touch pattern (e.g., the pattern of the driving electrodes 222 and/or the pattern of the sensing electrodes 224) is formed.

According to an embodiment of the disclosure, the electronic device 100 may be configured such that the electrode pattern 171, 173, or 175 of the conductive layer 170 is at least partially aligned with the touch pattern (e.g., the pattern of the driving electrodes 222 and/or the pattern of the sensing electrodes 224) of the display module 150 when the electronic device 100 is in the first state (e.g., the state of FIG. 1 and the state of FIG. 4A).

For example, the electrode pattern 171, 173, or 175 may be formed in a form at least partially corresponding to the touch pattern of the touch panel 220. In this case, in the first state, the touch panel 220 of the second region 152 may be disposed to face the conductive layer 170, and thus the touch pattern and the electrode pattern 171, 173, or 175 may be configured to at least partially correspond to each other. For example, points (e.g., touch input recognition points or touch nodes) at which a plurality of touch electrodes (e.g., the driving electrodes 222 and the sensing electrodes 224) intersect in the touch panel 220 may be disposed to at least partially coincide with predetermined points or intersecting points concentrated in the direction toward the inside of the electrode pattern 171, 173, or 175 of the conductive layer 170. According to an embodiment, the density of the electrode pattern 171, 173, or 175 may be lower than the density of the touch pattern (e.g., the pattern of the driving electrodes 222 and/or the pattern of the sensing electrodes 224).

By partially corresponding the electrode pattern 171, 173, or 175 of the conductive layer 170 and the touch input recognition points (e.g., touch nodes) at which the plurality of touch electrodes (e.g., the driving electrodes 222 and the sensing electrodes 224) intersect in the touch panel 220, a change in the amount of charge in the electrode pattern 171, 173, or 175 may be more effectively transferred to the touch input recognition points, and thus an effect of improving the sensitivity and accuracy of a touch input may be further increased.

FIG. 11 is a block diagram illustrating an electronic device in a network environment according to an embodiment.

Referring to FIG. 11, the electronic device 301 in the network environment 300 may communicate with an electronic device 302 via a first network 398 (e.g., a short-range wireless communication network), or an electronic device 304 or a server 308 via a second network 399 (e.g., a long-range wireless communication network). According to an embodiment, the electronic device 301 may communicate with the electronic device 304 via the server 308. According to an embodiment, the electronic device 301 may include a processor 320, memory 330, an input device 350, a sound output device 355, a display device 360, an audio module 370, a sensor module 376, an interface 377, a haptic module 379, a camera module 380, a power management module 388, a battery 389, a communication module 390, a subscriber identification module (SIM) 396, or an antenna module 397. In some embodiments, at least one (e.g., the display device 360 or the camera module 380) of the components may be omitted from the electronic device 301, or one or more other components may be added in the electronic device 301. In some embodiments, some of the components may be implemented as single integrated circuitry. For example, the sensor module 376 (e.g., a fingerprint sensor, an iris sensor, or an illuminance sensor) may be implemented as embedded in the display device 360 (e.g., a display).

The processor 320 may execute, for example, software (e.g., a program 340) to control at least one other component (e.g., a hardware or software component) of the electronic device 301 coupled with the processor 320, and may perform various data processing or computation. According to one embodiment, as at least part of the data processing or computation, the processor 320 may load a command or data received from another component (e.g., the sensor module 376 or the communication module 390) in volatile memory 332, process the command or the data stored in the volatile memory 332, and store resulting data in non-volatile memory 334. According to an embodiment, the processor 320 may include a main processor 321 (e.g., a central processing unit (CPU) or an application processor (AP)), and an auxiliary processor 323 (e.g., a graphics processing unit (GPU), an image signal processor (ISP), a sensor hub processor, or a communication processor (CP)) that is operable independently from, or in conjunction with, the main processor 321. Additionally or alternatively, the auxiliary processor 323 may be adapted to consume less power than the main processor 321, or to be specific to a specified function. The auxiliary processor 323 may be implemented as separate from, or as part of the main processor 321.

The auxiliary processor 323 may control at least some of functions or states related to at least one component (e.g., the display device 360, the sensor module 376, or the communication module 390) among the components of the electronic device 301, instead of the main processor 321 while the main processor 321 is in an inactive (e.g., sleep) state, or together with the main processor 321 while the main processor 321 is in an active state (e.g., executing an application). According to an embodiment, the auxiliary processor 323 (e.g., an image signal processor or a communication processor) may be implemented as part of another component (e.g., the camera module 380 or the communication module 390) functionally related to the auxiliary processor 323.

The memory 330 may store various data used by at least one component (e.g., the processor 320 or the sensor module 376) of the electronic device 301. The various data may include, for example, software (e.g., the program 340) and input data or output data for a command related thereto. The memory 330 may include the volatile memory 332 or the non-volatile memory 334.

The program 340 may be stored in the memory 330 as software, and may include, for example, an operating system (OS) 342, middleware 344, or an application 346.

The input device 350 may receive a command or data to be used by other component (e.g., the processor 320) of the electronic device 301, from the outside (e.g., a user) of the electronic device 301. The input device 350 may include, for example, a microphone, a mouse, a keyboard, or a digital pen (e.g., a stylus pen).

The sound output device 355 may output sound signals to the outside of the electronic device 301. The sound output device 355 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 360 may visually provide information to the outside (e.g., a user) of the electronic device 301. The display device 360 may include, for example, a display, a hologram device, or a projector and control circuitry to control a corresponding one of the display, hologram device, and projector. According to an embodiment, the display device 360 may include touch circuitry adapted to detect a touch, or sensor circuitry (e.g., a pressure sensor) adapted to measure the intensity of force incurred by the touch.

The audio module 370 may convert a sound into an electrical signal and vice versa. According to an embodiment, the audio module 370 may obtain the sound via the input device 350, or output the sound via the sound output device 355 or a headphone of an external electronic device (e.g., an electronic device 302) directly (e.g., wiredly) or wirelessly coupled with the electronic device 301.

The sensor module 376 may detect an operational state (e.g., power or temperature) of the electronic device 301 or an environmental state (e.g., a state of a user) external to the electronic device 301, and then generate an electrical signal or data value corresponding to the detected state. According to an embodiment, the sensor module 376 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 377 may support one or more specified protocols to be used for the electronic device 301 to be coupled with the external electronic device (e.g., the electronic device 302) directly (e.g., wiredly) or wirelessly. According to an embodiment, the interface 377 may include, for example, a high definition multimedia interface (HDMI), a universal serial bus (USB) interface, a secure digital (SD) card interface, or an audio interface.

A connecting terminal 378 may include a connector via which the electronic device 301 may be physically connected with the external electronic device (e.g., the electronic device 302). According to an embodiment, the connecting terminal 378 may include, for example, a HDMI connector, a USB connector, a SD card connector, or an audio connector (e.g., a headphone connector).

The haptic module 379 may convert an electrical signal into a mechanical stimulus (e.g., a vibration or a movement) or electrical stimulus which may be recognized by a user via his tactile sensation or kinesthetic sensation. According to an embodiment, the haptic module 379 may include, for example, a motor, a piezoelectric element, or an electric stimulator.

The camera module 380 may capture a still image or moving images. According to an embodiment, the camera module 380 may include one or more lenses, image sensors, image signal processors, or flashes.

The power management module 388 may manage power supplied to the electronic device 301. According to one embodiment, the power management module 388 may be implemented as at least part of, for example, a power management integrated circuit (PMIC).

The battery 389 may supply power to at least one component of the electronic device 301. According to an embodiment, the battery 389 may include, for example, a primary cell which is not rechargeable, a secondary cell which is rechargeable, or a fuel cell.

The communication module 390 may support establishing a direct (e.g., wired) communication channel or a wireless communication channel between the electronic device 301 and the external electronic device (e.g., the electronic device 302, the electronic device 304, or the server 308) and performing communication via the established communication channel. The communication module 390 may include one or more communication processors that are operable independently from the processor 320 (e.g., the application processor (AP)) and supports a direct (e.g., wired) communication or a wireless communication. According to an embodiment, the communication module 390 may include a wireless communication module 392 (e.g., a cellular communication module, a short-range wireless communication module, or a global navigation satellite system (GNSS) communication module) or a wired communication module 394 (e.g., a local area network (LAN) communication module or a power line communication (PLC) module). A corresponding one of these communication modules may communicate with the external electronic device via the first network 398 (e.g., a short-range communication network, such as Bluetooth™, wireless-fidelity (Wi-Fi) direct, or infrared data association (IrDA)) or the second network 399 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 392 may identify and authenticate the electronic device 301 in a communication network, such as the first network 398 or the second network 399, using subscriber information (e.g., international mobile subscriber identity (IMSI)) stored in the subscriber identification module 396.

The antenna module 397 may transmit or receive a signal or power to or from the outside (e.g., the external electronic device) of the electronic device 301. According to an embodiment, the antenna module 397 may include an antenna including a radiating element composed of a conductive material or a conductive pattern formed in or on a substrate (e.g., PCB). According to an embodiment, the antenna module 397 may include a plurality of antennas. In such a case, at least one antenna appropriate for a communication scheme used in the communication network, such as the first network 398 or the second network 399, may be selected, for example, by the communication module 390 (e.g., the wireless communication module 392) from the plurality of antennas. The signal or the power may then be transmitted or received between the communication module 390 and the external electronic device via the selected at least one antenna. According to an embodiment, another component (e.g., a radio frequency integrated circuit (RFIC)) other than the radiating element may be additionally formed as part of the antenna module 397.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 301 and the external electronic device 304 via the server 308 coupled with the second network 399. Each of the electronic devices 302 and 304 may be a device of a same type as, or a different type, from the electronic device 301. According to an embodiment, all or some of operations to be executed at the electronic device 301 may be executed at one or more of the external electronic devices 302, 304, or 308. For example, if the electronic device 301 should perform a function or a service automatically, or in response to a request from a user or another device, the electronic device 301, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 301. The electronic device 301 may provide the outcome, with or without further processing of the outcome, as at least part of a reply to the request. To that end, a cloud computing, distributed computing, or client-server computing technology may be used, for example.

Figure 12:
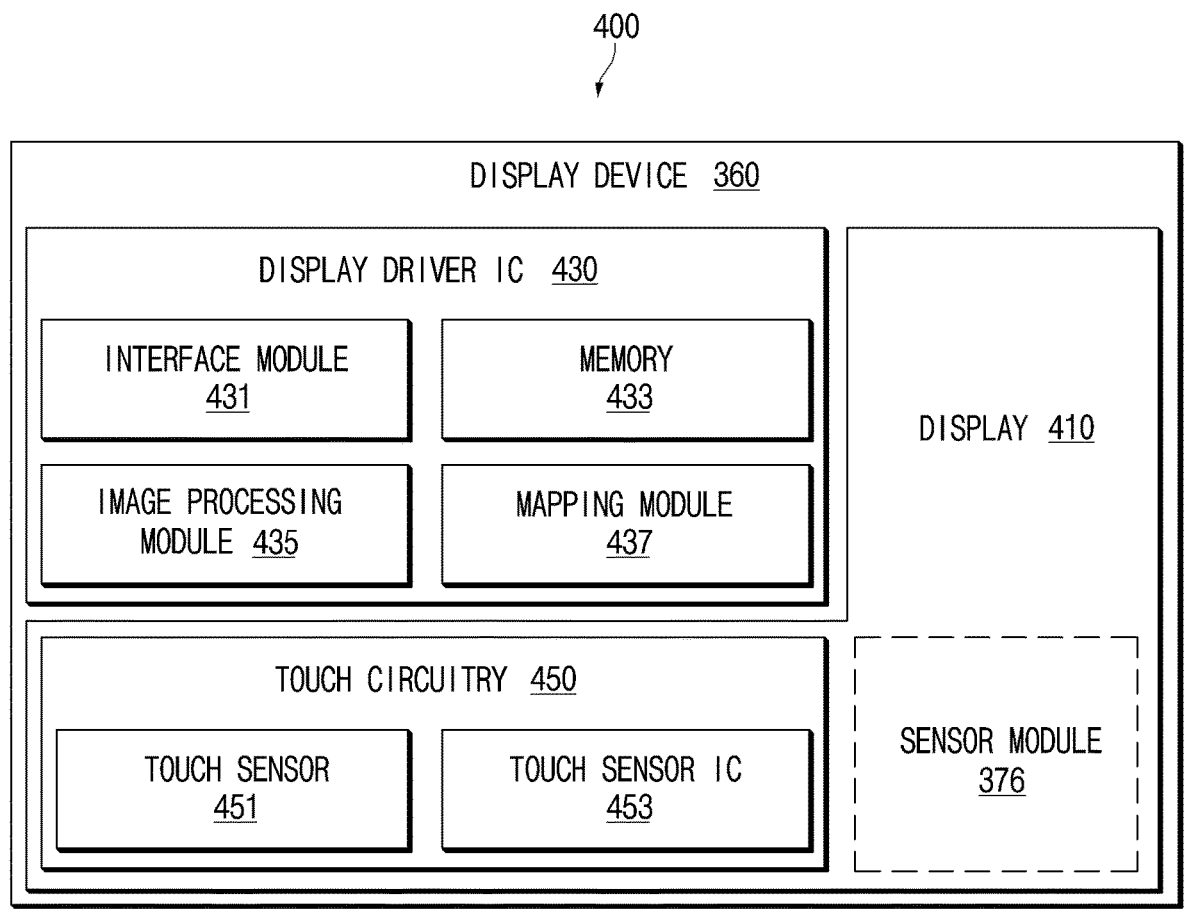
FIG. 12 is a block diagram illustrating the display device according to an embodiment.

FIG. 12 is a block diagram illustrating the display device according to an embodiment.

Referring to FIG. 12, the display device 360 may include a display 410 and a display driver integrated circuit (DDI) 430 to control the display 410. The DDI 430 may include an interface module 431, memory 433 (e.g., buffer memory), an image processing module 435, or a mapping module 437. The DDI 430 may receive image information that contains image data or an image control signal corresponding to a command to control the image data from another component of the electronic device 301 via the interface module 431. For example, according to an embodiment, the image information may be received from the processor 320 (e.g., the main processor 321 (e.g., an application processor)) or the auxiliary processor 323 (e.g., a graphics processing unit) operated independently from the function of the main processor 321. The DDI 430 may communicate, for example, with touch circuitry 450 or the sensor module 376 via the interface module 431. The DDI 430 may also store at least part of the received image information in the memory 433, for example, on a frame by frame basis. The image processing module 435 may perform pre-processing or post-processing (e.g., adjustment of resolution, brightness, or size) with respect to at least part of the image data. According to an embodiment, the pre-processing or post-processing may be performed, for example, based at least in part on one or more characteristics of the image data or one or more characteristics of the display 410. The mapping module 437 may generate a voltage value or a current value corresponding to the image data pre-processed or post-processed by the image processing module 435. According to an embodiment, the generating of the voltage value or current value may be performed, for example, based at least in part on one or more attributes of the pixels (e.g., an array, such as an RGB stripe or a pentile structure, of the pixels, or the size of each subpixel). At least some pixels of the display 410 may be driven, for example, based at least in part on the voltage value or the current value such that visual information (e.g., a text, an image, or an icon) corresponding to the image data may be displayed via the display 410.

According to an embodiment, the display device 360 may further include the touch circuitry 450. The touch circuitry 450 may include a touch sensor 451 and a touch sensor IC 453 to control the touch sensor 451. The touch sensor IC 453 may control the touch sensor 451 to sense a touch input or a hovering input with respect to a certain position on the display 410. To achieve this, for example, the touch sensor 451 may detect (e.g., measure) a change in a signal (e.g., a voltage, a quantity of light, a resistance, or a quantity of one or more electric charges) corresponding to the certain position on the display 410. The touch circuitry 450 may provide input information (e.g., a position, an area, a pressure, or a time) indicative of the touch input or the hovering input detected via the touch sensor 451 to the processor 320. According to an embodiment, at least part (e.g., the touch sensor IC 453) of the touch circuitry 450 may be formed as part of the display 410 or the DDI 430, or as part of another component (e.g., the auxiliary processor 323) disposed outside the display device 360.

According to an embodiment, the display device 360 may further include at least one sensor (e.g., a fingerprint sensor, an iris sensor, a pressure sensor, or an illuminance sensor) of the sensor module 376 or a control circuit for the at least one sensor. In such a case, the at least one sensor or the control circuit for the at least one sensor may be embedded in one portion of a component (e.g., the display 410, the DDI 430, or the touch circuitry 450)) of the display device 360. For example, when the sensor module 376 embedded in the display device 360 includes a biometric sensor (e.g., a fingerprint sensor), the biometric sensor may obtain biometric information (e.g., a fingerprint image) corresponding to a touch input received via a portion of the display 410. As another example, when the sensor module 376 embedded in the display device 360 includes a pressure sensor, the pressure sensor may obtain pressure information corresponding to a touch input received via a partial or whole area of the display 410. According to an embodiment, the touch sensor 451 or the sensor module 376 may be disposed between pixels in a pixel layer of the display 410, or over or under the pixel layer.

An electronic device 100 according to an embodiment of the disclosure may include a first structure 120, a second structure 140 that is connected to the first structure 120 so as to slide relative to the first structure 120 and that surrounds at least a portion of the first structure 120, a display module 150 that is disposed on the second structure 140 and that is movable together with the second structure 140 relative to the first structure 120, and a back cover 160 that forms at least a portion of an outer surface of the electronic device 100 and that is disposed to face the first structure 120. The display module 150 may include a first region 151 and a second region 152 that extends from the first region 151, and the first region 151 or the second region 152 may be formed to be at least partially flexible. The back cover 160 may include a window region 162 having at least a partial region formed of a transparent or translucent material and a conductive layer 170 disposed on at least a portion of the window region 162 to face toward the first structure 120. The electronic device 100 may include a first state in which the first region 151 forms a front surface of the electronic device 100 and at least a portion of the second region 152 is disposed between the first structure 120 and the back cover 160 and visually exposed on a rear surface of the electronic device 100 through the window region 162 and a second state in which at least a portion of the second region 152 forms the front surface of the electronic device 100 together with the first region 151. In the first state, at least a portion of the second region 152 may be configured to receive a touch input from the outside through the window region 162 and the conductive layer 170.

In an embodiment, an electronic device includes a display module which is flexible and displays an image, the display module including a first display region 151 which forms a front surface of the electronic device, and a second display region 152 which extends from the first display region and tactically senses an external input (e.g., a touch input) via a conductive layer, a first structure facing the display module and along which the display module is slidable, a second structure slidably connected to the first structure, the second structure being further connected to the display module and slidable together therewith along the first structure, and a back cover which faces the first structure and forms a rear surface of the electronic device which is opposite to the front surface, the back cover including a window region through which the image is viewable and the external input is sensable, and the conductive layer on the window region and facing the first structure. The second structure which slides towards the first structure closes the electronic device (e.g., a first state), the second structure which slides away from the first structure opens the electronic device (e.g., a second state), the electronic device which is closed defines the front surface including the first display region, together with disposing the second display region between the first structure and back cover and tactically exposed at the window region of the back cover, and the electronic device which is open defines the front surface including the first display region, together with a portion of the second display region.

In various embodiments, the conductive layer 170 may include at least one electrode pattern 171, 173, or 175, and the electrode pattern 171, 173, or 175 may include at least one of a straight line, a curved line, or a closed curve formed of a straight line or a curved line. That is, the electrode pattern includes at least one of a straight line, a curved line, or a closed shape (e.g., an enclosed shape like shown in FIGS. 9B, 9C, 9D and 9E).

In various embodiments, the conductive layer 170 may include an electrode formed of a transparent or translucent material.

In various embodiments, the electrode pattern 171, 173, or 175 may include a metal electrode pattern or indium tin oxide (ITO) electrode pattern 171, 173, or 175 that has a mesh shape.

In various embodiments, the electrode pattern 171, 173, or 175 may be formed in a form in which a plurality of circular or polygonal figures overlap one another. That is, the electrode pattern includes a plurality of circular shapes or a plurality of polygonal shapes which overlap one another.

In various embodiments, the display module 150 may include a display panel 230 and a touch panel 220 disposed on at least one surface of the display panel 230. The touch panel 220 may include a touch pattern formed by a plurality of driving electrodes 222 and a plurality of sensing electrodes 224. In the first state, the display panel 230 and at least a portion of the touch panel 220 may face the conductive layer 170, and the electrode pattern may be configured to be at least partially aligned with the touch pattern.

In an embodiment, the display module further includes a display panel and a touch panel which faces the display panel, the touch panel includes a touch pattern having a plurality of driving electrodes and a plurality of sensing electrodes, and the electronic device which is closed disposes the display panel and the touch panel facing the conductive layer on the window region, together with the electrode pattern of the conductive layer aligned with the touch pattern of the touch panel.

In various embodiments, the back cover 160 may include an opaque region 163 that extends from the window region 162, and a conductive region 165 electrically connected with the conductive layer 170 may be formed on at least a portion of the opaque region 163. That is, the back cover further includes an opaque region extended from the window region, and a conductive region which is on the opaque region and electrically connected with the conductive layer on the window region.

In various embodiments, the electronic device 100 may further include a printed circuit board (PCB) 190 disposed between the first structure 120 and the back cover 160, and the conductive region 165 may be electrically connected with the printed circuit board 190.

In various embodiments, at least a portion of the conductive layer 170 may extend toward the opaque region 163 such that the conductive region 165 is integrally formed with the conductive layer 170. That is, the conductive layer on the window region extends toward the opaque region to define the conductive region on the opaque region.

In various embodiments, the second structure 140 may include a first support portion 141 on which one portion of the first region 151 is disposed and a second support portion 142 that extends from the first support portion 141 and on which another portion of the first region 151 and the second region 152 are disposed.

In an embodiment, a first portion of the first display region, a second portion of the first display region and the second display region are arranged in a first direction (e.g., along the X axis direction). The second structure includes a first support portion corresponding to the first portion of the first display region, and a second support portion which is extended from the first support portion in the first direction and corresponds to the second portion of the first display region and to the second display region.

In various embodiments, at least part of the second support portion 142 may be inserted into or withdrawn from a space between the first structure 120 and the back cover 160 as the second structure 140 slides relative to the first structure 120. That is, the first structure and the back cover provide a space therebetween. Sliding of the second structure, together with the display module, along the first structure, provides insertion of the second support portion into or withdrawal of the second support portion from the space between the first structure and the back cover.

In various embodiments, the first structure 120 may include a first surface 121 and a second surface 122 that faces away from the first surface 121, and when the electronic device 100 is changed from the first state to the second state, at least part of the second support portion 142 may be separated from between the second surface 122 of the first structure 120 and the back cover 160 and may be disposed to face the first surface 121 of the first structure 120. That is, the first structure includes a first surface, and a second surface which is opposite to the first surface and closer to the rear surface of the electronic device than the first surface. The electronic device which is closed disposes a portion of the second support portion between the second surface of the first structure and the back cover, and the electronic device which is open disposes the portion of the second support portion region facing the first surface of the first structure.

In various embodiments, the second support portion 142 may be formed of a bendable material so as to at least partially form a curved surface in the first state or the second state. That is, the first structure includes an end along which the display module is slidable together with the second structure. The electronic device which is closed or the electronic device which is open disposes the second support portion of the second structure having a curved surface along the end of the first structure.

In various embodiments, the second support portion 142 may include a first edge 142a connected with the first support portion 141 and a second edge 142b that forms an end portion of the second support portion, and the first edge 142a and the second edge 142b may be configured to move in opposite directions, respectively, when the second structure 140 slides relative to the first structure 120.

In an embodiment, the second support portion includes a first edge which is closest to the first support portion, and at which the first support portion is connected to the second support portion, and a second edge which is furthest from the first support portion and forms an end portion of the second structure. Sliding of the second structure, together with the display module, along the first structure, moves the first edge and the second edge in opposite directions along the first structure.

In various embodiments, the first structure 120 may include a first roller member 132 disposed on one side of the first structure 120 so as to be rotatable, a second roller member 134 disposed on an opposite side of the first structure 120 so as to be rotatable, and a belt member 136 having at least a portion disposed to surround the second roller member 134 and opposite end portions connected to the second structure 130. Each of the first roller member 132 and the second roller member 134 may be configured to rotate in a direction the same as a sliding direction of the second structure 140 when the second structure 140 slides.

In an embodiment, the second structure is slidable together with the display module along the first structure, along a sliding direction. The first structure includes a first roller which is disposed at a first end the first structure and rotatable in the sliding direction, a second roller which is disposed at a second end opposite to the first end of the first structure and rotatable in the sliding direction, and a belt which extends along the second roller, the belt including opposite ends each connected to the second structure.

In various embodiments, the second structure 140 may include a first support portion 141 and a second support portion 142 that extends from the first support portion 141. The belt member 136 may be disposed such that one end portion 136a is connected to the first support portion and an opposite end portion 136b is connected to the second support portion 142 in a state in which the belt member 136 surrounds the second roller member 134, and the belt member 136 may provide tension to maintain the second support portion 142 in a tight state.

In an embodiment, a first portion of the first display region, a second portion of the first display region and the second display region are arranged in a first direction. The second structure includes a first support portion corresponding to the first portion of the first display region, and a second support portion which is extended from the first support portion in the first direction and corresponds to the second portion of the first display region and to the second display region. The belt provides tension to the second support portion, the belt including a first end connected to the first support portion, and a second end connected to the second support portion.

In various embodiments, the second support portion 142 of the second structure 140 may be disposed to surround at least a portion of the first roller member 132, and the one end portion 136a and the opposite end portion 136b of the belt member 136 may be moved in opposite directions by the first roller member 132 and the second roller member 134 when the second structure 140 slides. That is, the second support portion of the second structure extends along the first roller, and sliding of the second structure, together with the display module, along the first structure, rotates the first roller and the second roller, together with moving the first end and the second end of the belt in opposite directions along the first structure.

In various embodiments, when the second structure 140 slides, the first roller member 132 may rotate while making contact with the second support portion 142, and the second roller member 134 may rotate while making contact with the belt member 136. That is, Sliding of the second structure, together with the display module, along the first structure, disposes the second support portion in contact with the first roller to rotate the first roller, together with disposing the belt in contact with the second roller to rotate the second roller.

An electronic device 100 according to an embodiment of the disclosure may include a case 110 including a support member 110-3, a first side member 110-1, and a second side member 110-2, the first side member 110-1 and the second side member 110-2 being disposed on opposite end portions of the support member 110-3, a first structure 120 having at least a portion surrounded by the case 110, a second structure 140 connected to the first structure 120 so as to slide relative to the first structure 120, a display module 150 disposed on the second structure 140 so as to be movable together with the second structure 140 relative to the first structure 120 and formed to be at least partially flexible, the display module 150 including a first region 151 and a second region 152 that extends from the first region 151, and a back cover 160 that forms at least a portion of a rear surface of the electronic device 100 and that is disposed to surround the support member 110-3, the back cover 160 including a window region 162 formed to be transparent and a conductive layer 170 disposed on at least a portion of the window region 162. The electronic device 100 may be changed between a first state and a second state as the second structure 140 slides. In the first state, the first region 151 may form a front surface of the electronic device, 100 and at least a portion of the second region 152 may be visually exposed on the rear surface of the electronic device 100 through the window region 162. In the second state, at least a portion of the second region 152 may form the front surface of the electronic device 100 together with the first region 151. In the first state, at least a portion of the second region 152 may be located to face the window region 162 and the conductive layer 170 and may be configured to receive a touch input from the outside through the window region 162 and the conductive layer 170.

In an embodiment, an electronic device includes a case including a support member including a first end and a second end opposite to each other in a first direction, a first side member which is connected to the support member at the first end, and a second side member which is connected to the support member at the second end, a display module which is flexible and displays an image, the display module including a first display region which forms a front surface of the electronic device, and a second display region which extends from the first display region and tactically senses an external input via a conductive layer, a first structure facing the display module and along which the display module is slidable between the first side member and the second side member of the case and in a sliding direction which crosses the first direction, a second structure slidably connected to the first structure, the second structure being further connected to the display module and slidable together therewith along the first structure, and a back cover which faces the first structure with the support member of the case therebetween, and forms a rear surface of the electronic device which is opposite to the front surface, the back cover including a window region through which the image is viewable and the external input is sensable, and the conductive layer on the window region and facing the first structure. The second structure which slides towards the first structure closes the electronic device, the second structure which slides away from the first structure opens the electronic device, the electronic device which is closed defines the front surface including the first display region, together with disposing the second display region between the first structure and back cover and tactically exposed at the window region of the back cover, and the electronic device which is open defines the front surface including the first display region, together with a portion of the second display region.

In various embodiments, the conductive layer 170 may include at least one electrode pattern 171, 173, or 175, and the electrode pattern 171, 173, or 175 may include a metal electrode pattern or indium tin oxide (ITO) electrode pattern having a mesh shape.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. For example, a reference number labeling a singular form of an element within the drawing figures may be used to reference a plurality of the singular element within the text of specification.

It is to be understood that a singular form of a noun corresponding to an item may include one or more of the things, unless the relevant context clearly indicates otherwise. As used herein, "a", "an," "the," and "at least one" do not denote a limitation of quantity, and are intended to include both the singular and plural, unless the context clearly indicates otherwise. For example, "an element" has the same meaning as "at least one element," unless the context clearly indicates otherwise. As used herein, each of such phrases as "A or B", "at least one of A and B", "at least one of A or B", "A, B, or C", "at least one of A, B, and C", and "at least one of A, B, or C" may include any one of, or all possible combinations of the items enumerated together in a corresponding one of the phrases. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

As used herein, such terms as "1st" and "2nd", or "first" and "second" may be used to simply distinguish a corresponding component from another, and does not limit the components in other aspect (e.g., importance or order).

It is to be understood that if an element (e.g., a first element) is referred to, with or without the term "operatively" or "communicatively", as "coupled with", "coupled to", "connected with", or "connected to" another element (e.g., a second element), it means that the element may be coupled with the other element directly (e.g., wiredly, without an intervening element, without a third element, etc.), wirelessly, or via a third element. In contrast, when an element is referred to as being "directly" related to another element, there is no intervening element or third element therebetween. As being in contact, elements may form an interface therebetween.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The terms "below" or "beneath" can, therefore, encompass both an orientation of above and below.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

As used herein, the term "module" may include a unit implemented in hardware, software, or firmware, and may interchangeably be used with other terms, for example, "logic", "logic block", "part", or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 340) including one or more instructions that are stored in a storage medium (e.g., internal memory 336 or external memory 338) that is readable by a machine (e.g., the electronic device 301). For example, a processor (e.g., the processor 320) of the machine (e.g., the electronic device 301) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Where, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

The invention claimed is:

1. An electronic device comprising:
a display module which is flexible and displays an image, the display module including:
a first display region which forms a front surface of the electronic device,
a second display region which extends from the first display region, and
a touch panel which is in the first display region and the second display region and senses an external touch input;
a first structure which faces the display module and along which the display module is slidable;
a second structure slidably connected to the first structure, the second structure being further connected to the display module;
a back cover which forms a rear surface of the electronic device, the back cover including a window region through which the second display region is visually exposed; and
a conductive layer which is on the window region of the back cover, faces the second display region of the display module, into which an electrical charge is introduced by the external touch input via the window region, and within which electrical charge is changed by the electrical charge of the external touch input,
wherein in response to the external touch input on the window region, the touch panel in the second display region senses the changed electrical charge through the conductive layer.

2. The electronic device of claim 1, wherein
the conductive layer which is on the back cover, includes an electrode pattern, and
the electrode pattern includes a straight line, a curved line, or a closed shape having a straight line or a curved line.

3. The electronic device of claim 2, wherein
the electrode pattern has a mesh shape, and
the electrode pattern which has the mesh shape includes a metal electrode pattern or indium tin oxide electrode pattern.

4. The electronic device of claim 2, wherein the electrode pattern includes a plurality of circular shapes or a plurality of polygonal shapes which overlap one another.

5. The electronic device of claim 2, wherein
the display module further includes a display panel which faces the touch panel,
the touch panel includes a touch pattern having a plurality of driving electrodes and a plurality of sensing electrodes, and
the electronic device which is closed disposes the display panel and the touch panel facing the conductive layer on the window region, together with the electrode pattern of the conductive layer aligned with the touch pattern of the touch panel.

6. The electronic device of claim 1, wherein the conductive layer which is on the back cover, includes an electrode including a transparent material or translucent material.

7. The electronic device of claim 1, wherein the back cover further includes:
an opaque region extended from the window region, and
a conductive region which is on the opaque region and electrically connected with the conductive layer on the window region.

8. The electronic device of claim 7, wherein the conductive layer on the window region extends toward the opaque region to define the conductive region on the opaque region.

9. The electronic device of claim 1, wherein
a first portion of the first display region, a second portion of the first display region and the second display region are arranged in a first direction, and
the second structure includes:
    a first support portion corresponding to the first portion of the first display region; and
    a second support portion which is extended from the first support portion in the first direction and corresponds to the second portion of the first display region and to the second display region.

10. The electronic device of claim 9, wherein
the first structure and the back cover provide a space therebetween, and
sliding of the second structure, together with the display module, along the first structure, provides insertion of the second support portion into or withdrawal of the second support portion from the space between the first structure and the back cover.

11. The electronic device of claim 9, wherein
the first structure includes a first surface, and a second surface which is opposite to the first surface and closer to the rear surface of the electronic device than the first surface,
the electronic device which is closed disposes a portion of the second support portion between the second surface of the first structure and the back cover, and
the electronic device which is open disposes the portion of the second support portion region facing the first surface of the first structure.

12. The electronic device of claim 9, wherein
the first structure includes an end along which the display module is slidable together with the second structure, and
the electronic device which is closed or the electronic device which is open disposes the second support portion of the second structure having a curved surface along the end of the first structure.

13. The electronic device of claim 9, wherein
the second support portion includes:
    a first edge which is closest to the first support portion, and at which the first support portion is connected to the second support portion, and
    a second edge which is furthest from the first support portion and forms an end portion of the second structure, and
sliding of the second structure, together with the display module, along the first structure, moves the first edge and the second edge in opposite directions along the first structure.

14. The electronic device of claim 1, wherein
the second structure is slidable together with the display module along the first structure, along a sliding direction, and
the first structure includes:
    a first roller which is disposed at a first end the first structure and rotatable in the sliding direction,
    a second roller which is disposed at a second end opposite to the first end of the first structure and rotatable in the sliding direction, and
    a belt which extends along the second roller, the belt including opposite ends each connected to the second structure.

15. The electronic device of claim 14, wherein
a first portion of the first display region, a second portion of the first display region and the second display region are arranged in a first direction,
the second structure includes:
    a first support portion corresponding to the first portion of the first display region; and
    a second support portion which is extended from the first support portion in the first direction and corresponds to the second portion of the first display region and to the second display region, and
the belt provides tension to the second support portion, the belt including:
    a first end connected to the first support portion, and
    a second end connected to the second support portion.

16. The electronic device of claim 15, wherein
the second support portion of the second structure extends along the first roller, and
sliding of the second structure, together with the display module, along the first structure, rotates the first roller and the second roller, together with moving the first end and the second end of the belt in opposite directions along the first structure.

17. The electronic device of claim 16, wherein sliding of the second structure, together with the display module, along the first structure, disposes the second support portion in contact with the first roller to rotate the first roller, together with disposing the belt in contact with the second roller to rotate the second roller.

18. An electronic device comprising:
a display module which is flexible and displays an image, the display module including:
    a first display region which forms a front surface of the electronic device, and
    a second display region which extends from the first display region and senses an external touch input via a conductive layer:
a first structure which faces the display module and along which the display module is slidable;

a second structure slidably connected to the first structure, the second structure being further connected to the display module;

a printed circuit board disposed between the first structure and the back cover;

a back cover which forms a rear surface of the electronic device, the back cover including:
- a window region through which the second display region is visually exposed, and on which the conductive layer is disposed,
- an opaque region extending from the window region, and
- a conductive region which is on the opaque region and electrically connected with the conductive layer on the window region and the printed circuit board, wherein the conductive region of the back cover is electrically connected with the printed circuit board, and in response to the external touch input occurring on the window region, a change of charge of the conductive layer on the window region is transferred to at least a portion of the second display region and the at least a portion of the second display region is configured to detect the external touch input through the window region.

19. An electronic device comprising:

a case including a support member including a first end and a second end opposite to each other in a first direction, a first side member which is connected to the support member at the first end, and a second side member which is connected to the support member at the second end;

a display module which is flexible and displays an image, the display module including:
- a first display region which forms a front surface of the electronic device,
- a second display region which extends from the first display region, and
- a touch panel which is in the first display region and the second display region and senses an external touch input;

a first structure which faces the display module and along which the display module is slidable between the first side member and the second side member of the case and in a sliding direction which crosses the first direction;

a second structure slidably connected to the first structure, the second structure being further connected to the display module;

a back cover which forms a rear surface of the electronic device, the back cover including a window region through which the second display region is visually exposed; and a conductive layer which is on the window region of the back cover, faces the second display region of the display module, into which an electrical charge is introduced by the external touch input via the window region, and within which electrical charge is changed by the electrical charge of the external touch input, wherein in response to the external touch input on the window region, the touch panel in the second display region senses the changed electrical charge through the conductive layer.

20. The electronic device of claim 19, wherein the conductive layer which is on the back cover includes an electrode pattern, the electrode pattern has a mesh shape, and the electrode pattern which has the mesh shape includes a metal electrode pattern or indium tin oxide electrode pattern.

* * * * *